US008060397B2

(12) United States Patent
Neumaier et al.

(10) Patent No.: US 8,060,397 B2
(45) Date of Patent: Nov. 15, 2011

(54) METHOD AND SYSTEM FOR ASSET VALUATION USING A STATISTICAL APPROACH

(75) Inventors: Florian Neumaier, Munich (DE); Kurt-Ulrich Otte, Biederitz (DE); Ulrich von Rechberg, Munich (DE); Rudolf Reiser, Geiselhoering (DE)

(73) Assignee: SAP AG, Walldorf (DE)

( * ) Notice: Subject to any disclaimer, the term of this patent is extended or adjusted under 35 U.S.C. 154(b) by 162 days.

(21) Appl. No.: 11/768,001

(22) Filed: Jun. 25, 2007

(65) Prior Publication Data

US 2009/0018935 A1  Jan. 15, 2009

Related U.S. Application Data

(60) Provisional application No. 60/927,756, filed on May 4, 2007.

(51) Int. Cl.
*G06Q 40/00* (2006.01)

(52) U.S. Cl. ............................... 705/7.28; 705/38; 705/35

(58) Field of Classification Search .................. 705/1, 7, 705/30, 35, 36 R, 7.28, 38
See application file for complete search history.

(56) References Cited

U.S. PATENT DOCUMENTS

| | | | | |
|---|---|---|---|---|
| 5,812,988 A * | 9/1998 | Sandretto | ..................... | 705/36 R |
| 6,078,904 A * | 6/2000 | Rebane | ....................... | 705/36 R |
| 7,672,889 B2 * | 3/2010 | Brooks | ........................ | 705/36 R |
| 7,725,374 B2 * | 5/2010 | Van Erlach et al. | ............. | 705/35 |
| 2001/0041996 A1 * | 11/2001 | Eder | ............................... | 705/7 |
| 2002/0082903 A1 * | 6/2002 | Yasuzawa | ........................ | 705/10 |
| 2002/0123951 A1 * | 9/2002 | Olsen et al. | ....................... | 705/36 |
| 2003/0093347 A1 * | 5/2003 | Gray | ................................ | 705/35 |
| 2004/0024674 A1 * | 2/2004 | Feldman | ........................... | 705/36 |
| 2004/0128174 A1 * | 7/2004 | Feldman | .......................... | 705/7 |
| 2005/0027645 A1 * | 2/2005 | Lui et al. | ........................ | 705/38 |
| 2008/0154680 A1 * | 6/2008 | Ballow et al. | ..................... | 705/7 |
| 2009/0106133 A1 * | 4/2009 | Redmayne | ...................... | 705/35 |

OTHER PUBLICATIONS

Quantifying the value of IT-investments; C. Verhoef; Department of Mathematics and Computer Science, Free University of Amsterdam; Oct. 12, 2004; 28-pages.*
An analysis of the equity risk premium; Rakesh Bali and Hany Guirguis; Journal of Asset Management; Feb. 2004; 13-pages.*
Estimating risk premiums of individual hedge funds; Journal of Alternative Investements; Mar. 2006; 14-pages.*
Monte Carlo simulations for real estate valuation; Martin Hoesli, Elion Jani and André Bender; Journal of Property Investment & Finance; 2006; 21-pages.*
The nature of market growth, risk, and return; Michael J Dempsey; Financial Analysts Journal; May/Jun. 2002; 14-pages.*
The properties of the equity premium and the risk-free rate: An investigation . . . ; Fabio Canova and Gianni De Nicolo; IMF Staff Papers; 2003; 28-pages.*

(Continued)

*Primary Examiner* — Gregory Johnson
(74) *Attorney, Agent, or Firm* — Kenyon & Kenyon LLP

(57) ABSTRACT

The disclosed embodiments are directed to a system, non-transitory computer readable medium and method of determining a value of an asset and presenting a visualization of the determined asset value The exemplary system and method use past data and future plan data related to the asset that is processed by a computer to determine the asset value. Different valuation processes may be used to determine the asset value. The resulting valuations may be presented to a user for comparison purposes.

23 Claims, 32 Drawing Sheets

OTHER PUBLICATIONS

The weighted average cost of capital in frontier markets: theory and practice.; Journal of International Business and Economics; Jan. 2007; 10-pages.*

What is an appropriate value of the equity risk premium?; John Okunev and Patrick Wilson; Journal of Investing; Fall 1999; 5-pages.*

Elton et al., Modern Portfolio Theory and Investment Analysis, Eighth Edition, International Student Version, John Wiley & Sons, Inc., p. 318.

Fama et al., "The Capital Asset Pricing Model: Theory and Evidence," Journal of Economic Perspectives, vol. 18, No. 3, Summer 2004, pp. 25-46.

Merton, R., "An Intertemporal Capital Asset Pricing Model," Econometrica, 41(5): 867-887 (Sep. 1973).

Stapleton et al., "A Multiperiod Equilibrium Asset Pricing Model," Econometrica, 46(5):1077-1096 (Sep. 1978).

Jan. 30, 2008 European search report for Counterpart EP application 07012380.7.

* cited by examiner

FIG. 1

| | Plan Position | | Actual 2003 | Actual 2004 | Actual 2005 | Actual 2006 | Plan 2009 | Plan 2010 | Plan 2011 | Plan 2012 |
|---|---|---|---|---|---|---|---|---|---|---|
| ▽ | TOP | AE planning | 1,308,614 | 504,500 | 253,481 | 260,628 | -1,415,666 | -1417,273 | -1,518,727 | -1,748,068 |
| ▽ | ABS | Write downs to accounting entities | 1,394,059 | 1,149,285 | 935,608 | 869,078 | 861,405 | 861,405 | 881,405 | 861,405 |
| | ABS_001 | AE: Hdlr. normal writedowns | 1,357,381 | 1,149,285 | 935,608 | 869,078 | 861,405 | 861,405 | 881,405 | 861,401 |
| | ABS_003 | AE: Hdlr. unscheduled writedowns | 36,698 | 0 | 0 | 0 | 0 | 0 | 0 | 0 |
| ▽ | BTK | Expense of operating costs | 1,135,925 | 1,144,122 | 1,183,851 | 1,251,100 | | | | |
| | BTK_001 | operating costs: AE property tax | 90,818 | 90,819 | 90,818 | 111,252 | 114,139 | 117,988 | 121,833 | 125,580 |
| | BTK_002 | operating costs: AE operating costs | 577,793 | 811,493 | 625,713 | 612,852 | 595,069 | 589,654 | 584,260 | 578,856 |
| | BTK_003 | operating costs: AE hearing costs | 391,420 | 366,352 | 386,922 | 438,744 | 405,058 | 408,342 | 407,825 | 408,808 |
| | BTK_004 | operating costs: non-deductible pretax | 75,894 | 75,480 | 80,398 | 88,251 | 89,289 | 91,252 | 93,235 | 95,207 |
| | BTK_005 | operating costs: Entl. AE property tax | 0 | 0 | 0 | 0 | -114,139 | -117,985 | -121,833 | -125,880 |
| | BTK_006 | operating costs: Entl. AE operating costs | 0 | 0 | 0 | 0 | -595,069 | -589,664 | -584,260 | -578,856 |
| | BTK_007 | operating costs: Entl. AE hearing costs | 0 | 0 | 0 | 0 | -405,058 | -408,342 | -407,625 | -406,908 |
| | BTK_008 | operating costs: Entl. non-deductible pretax | 0 | 0 | 0 | 0 | -89,288 | -91,262 | -93,235 | -95,207 |
| ▽ | ERL | Revenue | -3,564,186 | -3,542,232 | -3,601,546 | -3,669,637 | -3,594,200 | -3,596,019 | -3,597,839 | -3,599,658 |
| | ERL_001 | Revenue HBW: target rent revenue | -2,307,850 | -2,354,211 | -2,388,836 | -2,383,281 | -2,357,152 | -2,357,152 | -2,357,152 | -2,357,152 |
| | ERL_002 | REvenue HBW: turnover rent/ other rev. | -47,201 | -10,758 | -4,782 | -9,411 | -17,419 | -17,049 | -16,678 | -18,307 |
| | ERL_003 | Revenue HBW: basic rent own use | -13,949 | -13,949 | -13,949 | -13,949 | -13,949 | -13,948 | -13,949 | -13,949 |
| | ERL_004 | Revenue HBW: calc. rev. vacancy | 1,399 | -8,285 | -4,672 | -10,518 | -37,260 | -37,260 | -37,260 | -37,260 |
| | ERL_005 | Revenue HBW: adj. payments, other rev. sc | 429 | 429 | 429 | 429 | 405 | 399 | 387 | 387 |

FIG. 6

| | C | D | E | F | G | H |
|---|---|---|---|---|---|---|
| 16 | Profit Center Group | DCF/m² | Rents/n | Rents - pot.irr | IH/m² | VK/m² |
| 17 | AE796 - Fernheizwer | 9,508.85 EUR | -18.34 EUR | -18.34 EUR | 2,209 EUR | 5.52 EUR |
| 18 | AE366 - Trostberger | -335.66 EUR | 2.19 EUR | 2.19 EUR | 335 EUR | 1.57 EUR |
| 19 | AE380 - Zornedinger | -794.80 EUR | 6.56 EUR | 7.37 EUR | 295 EUR | 1.08 EUR |
| 20 | AE379 - Ayingerstr. | -576.62 EUR | 5.98 EUR | 6.75 EUR | 292 EUR | 1.22 EUR |
| 21 | AE350 - Ismaininger | -379.01 EUR | 5.30 EUR | 6.42 EUR | 283 EUR | 1.42 EUR |
| 22 | AE372 - Rupertigaus | -525.84 EUR | 5.42 EUR | 6.24 EUR | 279 EUR | 1.00 EUR |
| 23 | AE381 - Zornedinger | -777.59 EUR | 6.47 EUR | 7.23 EUR | 278 EUR | 1.18 EUR |
| 24 | AE373 - Bad Schache | -896.85 EUR | 7.09 EUR | 7.44 EUR | 272 EUR | 1.33 EUR |
| 25 | AE801 - Passauer-So | 554.33 EUR | 2.53 EUR | 3.36 EUR | 268 EUR | 1.31 EUR |
| 26 | AE378 - Ayingerstr. | -631.26 EUR | 5.88 EUR | 6.68 EUR | 261 EUR | 1.28 EUR |
| 27 | AE470 - NH Giesing | -584.07 EUR | 8.76 EUR | 7.62 EUR | 254 EUR | 1.67 EUR |
| 28 | AE374 - Bad Schache | -849.52 EUR | 6.32 EUR | 6.82 EUR | 246 EUR | 1.03 EUR |
| 29 | AE368 - Rupertigaus | -834.26 EUR | 5.87 EUR | 6.72 EUR | 244 EUR | 0.82 EUR |
| 30 | AE371 - Rupertigaus | -873.38 EUR | 6.15 EUR | 6.85 EUR | 238 EUR | 0.99 EUR |
| 31 | AE351 - Handwerkerh | 2,954.48 EUR | 8.12 EUR | 8.12 EUR | 233 EUR | 7.21 EUR |
| 32 | AE367 - Rupertigaus | -800.04 EUR | 5.69 EUR | 6.60 EUR | 230 EUR | 1.04 EUR |
| 33 | AE482 - NH Ferd.Mll | -1,134.67 EUR | 7.78 EUR | 8.04 EUR | 228 EUR | 1.60 EUR |
| 34 | AE309 - Altbau Hari | -1,039.59 EUR | 6.26 EUR | 6.91 EUR | 223 EUR | 0.75 EUR |
| 35 | AE230 - Sanftanauer | -845.38 EUR | 5.97 EUR | 6.63 EUR | 219 EUR | 1.06 EUR |
| 36 | AE229 - Sanftanauer | -927.09 EUR | 6.45 EUR | 7.01 EUR | 217 EUR | 1.22 EUR |
| 37 | AE484 - NH Giesing | -932.52 EUR | 5.86 EUR | 6.47 EUR | 211 EUR | 0.82 EUR |

Planning File  Edit  Jump  System  Help

Implement DCF Calculation

Close Variables | Close Functions

Name of the Variables

| | Characteristic | Selection | Name |
|---|---|---|---|
| | Planning year | 2008 | 2006 |
| | Version | 906 | BPS: Quarter 2 |
| | Company code (characteristic to HierSEM_001, Exit) | | |
| | Company code | 0010 | GEWOFAG |
| | PCG: PCG (Char., Exit): SEM_0010HIER002 | | |
| | Cost Acc Code | 0010 | Cost Accounting Code GEWO |
| | PCG: PCG (Char., Exit): SEM_0010HIER002 | | |
| | Profit Center Group | 8243 | AE 440 - Hansapark I BA/WA |
| | Last actual period | | |
| | Key date (period end) | 012.2008 | 012.2006 |
| | Source version | | No restriction |

DCF of all PCGRP for Planning Year, Vrs, Accounting Code | Source version → Version Revenue | Discounting Interest Rate % | Operating Costs | Maintenance | Building Management | Administration: AE Calculate DCF

| 104 | Actual 2005 | Actual 2006 | Plan 2009 | Plan 2010 | Plan 2011 | Plan 2012 | Limit Plan |
|---|---|---|---|---|---|---|---|
| Inflow from revenue | -3,991,781.07 | -4,104,192.89 | -4,464,100.25 | -4,584,185.08 | -4,583,663.95 | -4,658,670.39 | 0.00 |
| Outflow from operating costs, modernization, build.. | 1,468,196.87 | 1,394,634.11 | 1,517,852.52 | 1,518,253.98 | 1,518,655.31 | 1,519,056.65 | 0.00 |
| Outflow from repairs | 541,562.81 | 65,487.86 | 0.00 | 0.00 | 0.00 | 0.00 | 0.00 |
| Cashflow from repairs | 0.00 | 0.00 | 0.00 | 0.00 | 0.00 | 0.00 | 0.00 |
| Cashflow without repairs (CFOI) | -2,523,584.20 | -2,709,558.78 | -2,946,247.63 | -3,015,931.10 | -3,065,008.64 | -3,139,613.74 | 0.00 |
| Cashflow (CF) | -1,982,021.39 | -2,644,070.92 | -2,946,247.63 | -3,015,931.10 | -3,065,008.64 | -3,139,613.74 | 0.00 |
| Discounted interest rate [%] | 0.000 | 0.000 | 4.123 | 4.123 | 4.125 | 4.135 | 4,289 |
| Discounted cashflow without repairs (DCFOI) | 0.00 | 0.00 | -2,611,060.69 | -2,568,979.87 | -2,505,403.83 | -2,464,481.33 | 0.00 |
| Discounted cashflow (DCF) | 0.00 | 0.00 | -2,611,060.69 | -2,566,979.87 | -2,505,403.83 | -2,464,481.33 | 0.00 |
| Const.: Estimated value for parameter A (CFOI ? A) | 0.000000000 | 0.000000000 | 0.000000000 | 0.000000000 | 0.000000000 | 0.000000000 | 0.000000000 |
| Const: CFOI: prognosis value | -2,702,527.19 | -2,702,527.19 | -2,702,527.19 | -2,702,527.19 | -2,702,527.19 | -2,702,527.19 | -2,702,527.19 |

(B)

SAP

| | Const:<br>DCFOI-<br>Limit | Const:<br>DCF-<br>Limit<br>Facto | Const:<br>KDCFOI:<br>ExpRiskAdj<br>Prognosis | Const:<br>KDCF:<br>ExpRiskAdj<br>Prognosis | Lin:<br>DCFOI-<br>Limit<br>Factor | Lin:<br>DCF-<br>Limit<br>Factor | Lin: KDCFOI:<br>ExpRiskAdj<br>Prognosis | Lin: KDCF:<br>ExpRiskAdj<br>Prognosis | NLin:<br>DCFOI-<br>Limit<br>Factor |
|---|---|---|---|---|---|---|---|---|---|
| | | | EUR | EUR | | | EUR | EUR | |
| 64 | 0010/6778 AE 776- Forstenisder Allee (ETW Gewe | 22.76 | 22.76 | -7,754.36 | -7,754.36 | 1.54 | 1.54 | -7,758.54 | -7,758.54 | -52.80 |
| 65 | 0010/6493 AE 403- DQ Narlachieg 3.BA | 23.02 | 23.02 | -75,473.06 | -75,473.06 | 15.01 | 15.01 | -75,007.33 | -75,007.33 | 13.01 |
| 66 | 0010/6227 AE 227- Kpfister 2.10 | 23.40 | 23.40 | -254,623.90 | -254,623.90 | 15.76 | 15.76 | -253,315.95 | -253,315.95 | 15.76 |
| 67 | 0010/6348 AE 340- Titureistr. | 22.74 | 22.74 | -63,383.42 | -63,383.42 | 16.58 | 16.58 | -64,343.34 | -64,343.34 | 16.50 |
| 68 | 0010/6249 AE 243- Von-Rester-Manzestr. | 23.06 | 23.06 | -180,327.13 | -180,327.13 | 17.05 | 17.05 | -173,078.83 | -173,078.33 | 17.05 |
| 69 | 0010/6366 AE 366- Trostberger Strasse | 22.63 | 22.63 | -61,968.45 | -61,968.45 | 17.31 | 17.31 | -80,313.21 | -80,313.21 | 18.43 |
| 70 | 0010/6283 AE 283- DG Machawsea 1.BA | 23.35 | 23.35 | -34,384.25 | -34,384.25 | 18.87 | 18.87 | -34,656.33 | -34,656.33 | 18.07 |
| 71 | 0010/6288 AE 288- Skagerrakstrasse | 23.47 | 23.47 | -421,783.31 | -411,750.88 | 15.32 | 15.36 | -424,423.98 | -414,431.55 | 18.52 |
| 72 | 0010/6258 AE 258- Nederling III Block & A | 23.25 | 23.25 | -75,238.35 | -75,238.35 | 15.34 | 15.34 | -74,883.06 | -74,883.06 | 13.54 |
| 73 | 0010/6338 AE 333- Pfarrweg | 23.10 | 23.10 | -70,223.75 | -70,223.75 | 20.03 | 20.03 | -63,540.07 | -63,540.07 | 20.03 |
| 74 | 0010/6222 AE 222- KSpflatr.14-16 | 23.47 | 23.47 | -111,469.42 | -111,469.42 | 20.46 | 20.03 | -111,866.88 | -111,866.88 | 20.03 |

Analysis of the limit factors/margin

| Key figures | | | | | |
|---|---|---|---|---|---|
| Profit center group | | | | | |
| Company code | GEWOFAG | | | | |
| Fiscal year val. | K4 | | | | |
| Version | BPS: Quarter 2 | | | | |
| Value type | Plan | | | | |
| Planning year | 2006 | | | | |

| Profit Center Group | Building Administration | Constant DCF value | Linear DCF value | Non-linear DCF value | Rev |
|---|---|---|---|---|---|
| 00010/0002-2 | KST02 - Real estate objects | -1,738,900,695.03 | -3,140,309,557.26 | -2,304,853,090.29 | -127 |
| 00100/KST02-IMMO | KST05 - Real estate objects | -380,892,553.02 | -643,214,012.79 | -472,454,874.18 | -26 |
| 00100/KST06-IMMO | KST01 - Real estate objects | -341,322,630.73 | -512,363,311.62 | -563,006,560.90 | -22 |
| 00100/KST01-IMMO | KST04 - Real estate objects | -340,566,050.50 | -704,212,040.34 | -704,212,040.33 | -26 |
| 00100/KST04-IMMO | KST03 - Real estate objects | -197,709,131.24 | -329,398,834.50 | -254,495,952.16 | -14 |
| 00100/KST03-IMMO | KST06 - Real estate objects | -188,454,637.32 | -315,513,324.17 | -270,941,292.81 | -14 |
| 00100/KST06-IMMO | KST07 - Real estate objects | -171,237,879.07 | -453,155,114.26 | -453,155,114.25 | -12 |
| 00100/KST07-IMMO | AE 243 - Old building Neuhausen | -138,771,725.25 | -182,506,831.67 | -154,583,253.91 | -10 |
| 0100/6243 | AE 242 - Old building Neuhausen | -57,280,537.44 | -113,578,160.19 | -85,294,617.71 | -4 |

106 — Constant DCF value  
108 — Linear DCF value  
110 — Non-linear DCF value

FIG. 15    GEWOFAG -SAP SEM planning/ strategy

Profit and loss statement - planning/strategy

Total Planning
Update | End | Save
☐ Variables
Planning year [2003 ▼]
Version [B01] BPB: Quartal 1 ▼
Company code [0010] GEWOFAG ▼
Load everything and roll up | Roll up (PCR) | Distribute | B00→B01 | B01→B02 | B02→B05 | B03→B04 | B04→B06 | Delete total planning | Delete version

| BIL | P&L | | | | | | |
|---|---|---|---|---|---|---|---|
| Plan position | | Actual 2001 | Actual 2002 | Plan 2004 | Plan 2005 | Plan 2006 | |
| ▽ BIL_000 | GEWOFAG | -1,360,070,156.02 | -739,813,362.44 | -102,786,617.77 | -103,256,770.10 | -101,896,893.79 | |
| ▽ BIL_310 | 3.1 sales revenue | -119,084,469.50 | -128,843,751.13 | -120,425,794.23 | -134,110,709.04 | -127,478,673.36 | |
| ▽ BIL_311 | 3.1.1 Revenue of the building management | -116,215,070.31 | -117,020,874.07 | -118,279,114.47 | -121,192,029.29 | -125,331,993.60 | |
| ERL_001 | Revenue HBW: Target rent revenue | -81,144,493.77 | -78,514,877.47 | -91352,720.83 | -84,080,052.35 | -85,594,433.88 | |
| ERL_002 | Revenue HBW:Turnover rent/ other revenue | -959,115.06 | -808,059.97 | -915,230.75 | -932,892.63 | -950,554.47 | |
| ERL_003 | Revenue HBW: basic rent ownuse | -787,853.61 | -787,712.54 | -952,364.05 | -993,107.71 | -1,033,851.33 | |
| ERL_004 | Revenue HBW: calc. rev. vacancy | -1,017,058.76 | -858,633.49 | -1,039,176.37 | -1,058,114.41 | -1,217,919.68 | |
| ERL_005 | Revenue HBW: adj. payments, other rev. sc | -15,085.19 | 18,300.42 | 10,053.35 | -10,317.77 | 10,581.77 | |
| ERL_008 | Revenue HBW: calculation operating costs | -22,131,899.11 | -22,961,825.94 | -20750,769.86 | -21,389,001.70 | -22,027,233.55 | |
| ERL_010 | Revenue HBW: calculation heating costs | -8,661,511.76 | -11,037,120.84 | -9523,990.57 | -10,957,844.51 | -11,791,598.43 | |
| ERL_011 | Revenue HBW: calculation non-ded pretax | -1,933,235.35 | -2,279,270.56 | -2,170,880.37 | -2,314,469.39 | -2,458,058.40 | |
| ERL_013 | Revenue HBW: rent/ expense subsidy | -1,193,045.00 | -1,199,258.81 | -1,357,035.82 | -1,326,231.95 | -1,295,428.16 | |
| ERL_012 | Revenue HBW: contribution shortfall risk | -206,949.04 | -218,050.80 | -218,540.32 | -221,854.51 | -225,189.68 | |
| ERL_006 | Revenue HBW: calculate expenses vacancy | -1,017,058.76 | 858,633.49 | 1,039,176.37 | -1,058,114.41 | 1,217,919.68 | |
| ERL_007 | Revenue HBW: occupancy costs rent own use | -787,948.20 | 787,712.54 | 952,364.05 | -993,107.71 | 1,033,851.33 | |
| MMG_001 | KG: Sales revenue from the HBW | 0.00 | 0.00 | 0.00 | 0.00 | 0.00 | |
| ▽ BIL_312 | 3.1.2 Revenue from the sale of property | -1,971,142.59 | -10,745,326.81 | -3,000,000.00 | -11,772,000.00 | -1,000,000.00 | |
| ERA_001 | Revenue Chg: From sale | -1,971,142.59 | -10,745,326.81 | -3,000,000.00 | -11,772,000.00 | -1,000,000.00 | |
| ▽ BIL_313 | 3.1.3 Revenue from case activity | -287,410.38 | -227,129.07 | -240,804.47 | -240,804.47 | -240,804.47 | |
| ERA_002 | Revenue Chg: | -287,410.38 | -227,129.07 | -240,804.47 | -240,804.47 | -240,804.47 | |
| ▽ BIL_313 | 3.1.4 Revenue from deliveries/ activities: | -610,846.22 | -850,421.18 | -905,875.29 | -905,875.29 | -905,875.29 | |
| ERA_003 | Revenue Chg: From deliveries/ activities: | -610,846.22 | -850,421.18 | -905,875.29 | -905,875.28 | -905,875.28 | |

FIG. 18

GEWOFAG -
Determination of risk characteristic numbers for portfolios

| File | Edit | View | Favorites | Extras | Back | ? |
|---|---|---|---|---|---|---|

← Back ⊕ ☒ ☐ 🔎 Search ☆ Favorites

Address ☐ http://www.gewofag.de  ⬆ Change to  ☐ Links  ☐ Intranet  ☐ WebAccess  ☐ Employee phonebook Portfolio: Risk key figures
Calculations and evaluations
Go to page: Home Calculations: Portfolio Calculations Calculations of Key Figures General Functions: Save Update End List calc. portfolio

| Portfolio | Cal year/month | Ver. | Key figure | | expect of rel. value change | St. dev. of value change | Variance of value change | Total value time OK |
|---|---|---|---|---|---|---|---|---|
| 0000000001 MUC1 | 12 2006 | 802 | DCF_017 | Risk-adjusted present value | ○ | 28.13% | 0.141 | 0.020 | -1303020.55 EUR |
| 0000000002 W.code 0020 | 12 2006 | 802 | DCF_017 | Risk-adjusted present value | ● | 29.50% | 0.147 | 0.022 | -179885429.44 EUR |
| 0000000003 Taufkirchen | 12 2006 | 800 | DCF_014 | Risk-adjusted cash flow | ○ | 42.32% | 0.212 | 0.045 | -3845486.06 EUR |
| | | | DCF_017 | Risk-adjusted present value | ○ | 42.70% | 0.212 | 0.046 | -1234565082.57 EUR |

| | | | | Value Change | PF risk variance of value change | PF total value at time + 0 | PF value at risk (95%) | Prod. value of key figure | Prod. share of total value |
|---|---|---|---|---|---|---|---|---|---|
| 000002 Company Code 0020 | | | | 0.147 | 0.022 | -17985429.44 EUR | 9421609.24 EUR | 0.00 EUR | 0.000 % |
| | 6262 | AE 262-Heidstra/Fun | | 0.000 | 0.000 | 0.000 EUR | 0.000 EUR | -10592669.85 EUR | 5.889 % |
| | 6263 | AE 263-Heidstr | | 0.000 | 0.000 | 0.000 EUR | 0.000 EUR | -403964.63 EUR | 2.281 % |
| | 6264 | AE 264-Heidstr | | 0.000 | 0.000 | 0.000 EUR | 0.000 EUR | -80846.38 EUR | 0.450 % |
| | 6265 | AE 265-Lazarettstr | | 0.000 | 0.000 | 0.000 EUR | 0.000 EUR | -126050563.26 EUR | 0.701 % |
| | 6266 | AE 266-Lazarettstr | | 0.000 | 0.000 | 0.000 EUR | 0.000 EUR | -1954832.14 EUR | 1.087 % |
| | 6267 | AE 267-Hiblestr 25- | | 0.000 | 0.000 | 0.000 EUR | 0.000 EUR | -9603183.13 EUR | 5.338 % |
| | 6268 | AE 268-Schachenmel | | 0.000 | 0.000 | 0.000 EUR | 0.000 EUR | -590344.13 EUR | 0.328 % |
| | 6269 | AE 269-Hiblerstr 25 | | 0.000 | 0.000 | 0.000 EUR | 0.000 EUR | 1297677.69 EUR | 0.721 % |
| | 6270 | AE 270-Pfanderstr29 | | 0.000 | 0.000 | 0.000 EUR | 0.000 EUR | -3558095.89 EUR | 1.978 % |
| | Prod. exp of rel. val change | | | 0.147 | 0.022 | -17985429.44 EUR | 9421609.24 EUR | -17985429.44 EUR | 99.999 % |

FIG. 25

METHOD AND SYSTEM FOR ASSET VALUATION USING A STATISTICAL APPROACH

CROSS REFERENCE TO RELATED APPLICATIONS

This is a Non-Provisional application of U.S. Provisional Application No. 60/927,756, filed May 4, 2007.

DESCRIPTION

The following application relates to a computerized method for processing and displaying data, computer program products, computer environments and a method for determining a value of a business unit.

There exists an increasing demand for providing economic evaluation of business units, such as real estate, vehicle parks, etc. A conventional statistical approach for asset valuation, in particular for evaluating a business unit can be a discounted cash flow (in the following referred to as "DCF") calculation, as described in the following.

Survey of Current Definitions and Methods of a DCF Calculation

In the following there is provided an exemplary overview of a common discounted cash flow calculation method, as it is available under www.wikipedia.org.

Common Definition of a Discounted Cash Flow Calculation

Definition

In finance, the discounted cash flow (DCF) approach describes a method to value a project or an entire company using the concepts of the time value of money. The DCF methods determine the present value of future cash flows by discounting them using the appropriate cost of capital. This is necessary because cash flows in different time periods cannot be directly compared since most people prefer money sooner rather than later (put simply: a dollar in your hand today is worth more than a dollar you may receive at some point in the future). The same logic applies to the difference between certain cash flows and uncertain ones, or "a bird in the hand is worth two in the bush". This is due to opportunity cost and risk over time. DCF procedure involves three problems:

the forecast of future cash flows,
the incorporation of taxes (firm income taxes as well as personal income taxes),
the determination of the appropriate cost of capital.

Discounted cash flow analysis is widely used in investment finance, real estate development, and corporate financial management.

Depending on the financing schedule of the company four different DCF methods are distinguished today. Since the underlying financing assumptions are different they do not need to arrive at the same value of the project or company:

Equity-Approach
Flows to equity approach (FTE)
Entity-Approach:
Adjusted present value approach (APV)
Weighted average cost of capital approach (WACC)
Total cash flow approach (TCF)

Mathematics

The discounted cash flow formula is derived from the future value formula for calculating the time value of money and compounding returns.

$$FV = PV \cdot (1+i)^n$$

The simplified version of the Discounted cash flow equation (for one cash flow in one future period) is expressed as:

$$DPV = \left(\frac{FV}{(1+d)^n}\right),$$

where
DPV is the discounted present value of the future cash flow (FV), or FV adjusted for the opportunity cost of future receipts and risk of loss;
FV is the nominal value of a cash flow amount in a future period;
d is the discount rate, which is the opportunity cost plus risk factor (or the time value of money: "i" in the future-value equation);
n is the number of discounting periods used (the period in which the future cash flow occurs). I.e. if the receipts occur at the end of year 1, n will be equal to 1; at the end of year 2, 2—likewise, if the cash flow happens instantly, n becomes 0, rendering the expression an identity (DPV=FV).

Where multiple cash flows in multiple time periods are discounted, it is necessary to sum them as follows:

$$DPV = \sum_{t=0}^{N} \frac{FV_t}{(1+d)^t}$$

for each future cash flow (FV) at any time period (t) for all time periods. The sum can then be used as a net present value figure or used to further calculate the internal rate of return for a cash flow pattern over time.

Enterprise Evaluation:

Theoretically, probability distributions have to be predicted for upcoming anticipated outputs. The probabilities can be interpreted with only subjective credibility or with grades of "taking-as-true" of an anticipated result. Probabilities extracted from logical considerations or from interpretation of relative frequencies/occurrences are not to be obtained for purposes of enterprise evaluation. Practitioners resist appointing explicit properties for future outputs because they justifiably are able to refer to the difficulties associated with their inspection of the data. [Ballwieser, Springer, Munchen 2004, p. 50f.]

However, the above estimate can be very difficult due to the large number of data, necessary to be handled. Moreover, said statistical evaluation approach is difficult due to the kind of data to be examined. Furthermore, a manual estimate by a human person is very cumbersome or even impossible due to the large data typically available and due to the nature of the data, which cannot be entirely overseen by a human person.

Accordingly, it is an object of the present invention to provide a possibility of evaluating a future evolution of a business unit.

This object is solved by the subject-matter of the independent claims. Preferred embodiments are subject to the dependent sub-claims.

Computerized Method

One aspect of the present invention relates to a computerized method for processing and displaying data of a business unit comprising the steps:

extracting a set of past data of said business unit from a past data base using a closed computer environment and introducing said set of past data into said closed computer environment;

extracting a set of future plan data of said business unit from a future plan data base using said closed computer environment and introducing said set of future plan data into said closed computer environment, wherein extracting of said set of future plan data comprises:

automatic determining and extracting of at least one preconfigured subset of said set of future plan data;

automatic extracting the remaining data of said future plan data from said data base;

determining at least one estimate value from said set of past data and said set of future plan data, using said closed computer environment and displaying said at least one determined estimate value.

Following that, in spite of a large set of past data and a large set of future plan data, advantageously, only very few parameters, namely the at least one estimate value is/are provided by the computerized method for evaluating the business unit. As an example, a large set of past data can be used. Said past data can comprise balance-data, including costs and income of the business unit. The business unit can be a real estate unit, comprising one or more real estates, such as apartments, apartment buildings, industrial buildings, supermarkets, warehouses, warehouse complexes etc. Additionally, a large set of future plan data is provided. Said future plan data can comprise e.g. possible future income, such as rent, increase of rent, and/or possible future costs, such as maintenance fees, etc. Advantageously, from the large number of data, at least one single parameter, namely the at least one estimate value is determined and displayed, which is used for evaluation and comparison of the business unit. Following that, said business unit can be compared and/or evaluated manually, i.e. by a human person in an easy manner using said at least one determined estimate value. Therefore, with this improved way of displaying data, a large number of data can be processed and visualized more efficiently.

Further advantageously, at least one pre-configured subset of the future plan data can be chosen by an operator of the computerized method and/or by the computerized method itself. Said pre-configured subset of said future plan data can be determined and said data and can be extracted automatically. Moreover, the remaining (sets of) future plan data are preferably extracted automatically from the data-base comprising all the future plan data.

Following that, further advantageously, it is possible to assure that a specific subset of the future plan data is extracted. In particular, it is possible to provide specific methods and/or ways of extracting such a pre-configured subset of future plan data. This can be particularly the case, when specific routines and/or methods are necessary for determining and/or extracting said pre-configured subset of said future plan data. As an example, the specific future plan data can be included in one or more floating text-files and/or pdf-files and/or picture-files, etc. Therefore, specific methods can be applied for extracting data from said files. Moreover, further future plan data can be provided as entries in a table. Therefore, said data can be easily extracted by entering said database/tables and reading said data in a conventional manner.

Moreover, two databases do not necessarily need to be provided. Rather, the past database and the future database can be part of a common database. Moreover, a database can be one or more tables. In other words, the past data and the future plan data can be comprised in one table.

Another advantage is that it is possible to obtain more than at least one value, namely the at least one estimate value, from a large number of given data. Moreover, it is also possible to simulate different values from the large number of data. Moreover, it is also possible to simulate different values from the large number of data. As an example one or more subsets of the large number of data can be changed and/or taken away from the given data. Following that, the at least one estimate value can be determined again and can be compared e.g. to the at least one estimate value determined with the entire subset. This step can also be carried out iteratively for one or more (different) subsets of data. Thereby, the effect of one or more such subsets of data on the at least one business unit can be determined easily. As an example, the at least one estimate value can be the discounted cash flow value of a business unit. The business unit can comprise a number of real estate objects. By changing the elements of the business unit, i.e. by deleting and/or introducing one or more further real estate objects, the effect of said objects on the estimate value can be easily determined.

Moreover, it may also be possible to determine the at least one estimate value depending from the market traded interest and/or from the degree of risk aversion (see below). It may be possible to provide a graphical display of the at least one estimate value as a function of the market traded interest and/or the degree of risk aversion.

In the present application, the term "determine" can be synonymous to the term "calculate".

In particular, the set of past data and the set of future plan data can be subsets of a common set of data. In particular, the past data can be extracted by a subsystem of the closed computer environment. Said subsystem can e.g. be a SAP QS system. Said subsystem can particularly be a source system. The SAP QS system is e.g. a so called Online Transactional Processing system. An OnLine Analytical Processing system (OLAP system) conventionally comprises or represents a decision support software that allows the user to quickly analyze information that has been summarized into multidimensional views and hierarchies.

Also the future plan data can be extracted by an SAP QS system. The database comprising the past and the future plan data can be part of the closed computer environment. At least part of the past data and/or the future plan data can be extracted by the SAP QS system into the closed computer environment. As an example, when automatically determining and extracting the subset of the future plan data, one or more statistical calculation(s) can be carried out. As an example, for the subset, a likelihood and/or an estimate can be provided, indicating the uncertainty of a value of one or more members of said subset. For the remaining subset of future plan data, as an example, no likelihood and/or no estimate, indicating the uncertainty of the values the members of said subset is provided. Rather, these future plan data are taken as given in the remaining subset.

Extracting the past data and the future plan data also comprises the step of providing the past data and the future plan data to another subsystem of the closed computer environment which e.g. is an SAP BW system. An SAP BW system is/comprises Data warehouse used as a basis for making strategic and operational decisions in companies. It combines state-of-the-art warehousing technology with preconfigured business content, and gives users a clear overview of company-internal data and any external data that is relevant. SAP Business Information Warehouse (SAP BW) contains a wide selection of predefined reports that have been specially tailored to meet the needs of specific industry sectors and user groups, for example production planners, financial controllers, human resource managers. The SAP BW system is e.g. a so called Online Transactional Processing system, also referred to as OLTP system. The OLTP system can be a conventional SAP ERP system. The SAP BW may be used to determine, in particular calculate the at least one estimate value.

In other words the computerized method allows an efficient way of extracting data, using a subsystem of the closed computer system. Said extracting step can comprise manipulating at least a subset of said data, e.g. the future plan data. Said data is the provided to the other subsystem of the closed computer environment, which then determines the at least one estimate value.

Further Embodiments of the Computerized Method

The closed computer environment system may, as an example, be or comprise a specific system application that is or can be installed on the computers of a company, such as a real estate management company. The specific system application may be a standard SAP product, e.g., a standard SAP computer program. In particular, the system application may be SAP R/3, and/or SAP, such as SAP ERP, SAP business suite, etc. Particularly, closed computer environment may be based on SAP R/3, and/or SAP, such as SAP ERP, SAP business suite or modifications thereof.

Advantageously, according to an embodiment, it is possible, to provide and/or manipulate and/or evaluate a large number of data, which can relate to real estate, as an example of a business unit, in an SAP environment, as described above. Data can, as an example, be imported and/or visualized using a conventional table calculation program, such as Microsoft Excel. Consequently, it is possible to evaluate a large number of data fast and effectively within one system.

According to a specific embodiment, the step of automatically determining and extracting said at least one pre-configured subset of said future plan data comprises:
  automatic evaluation of contract data;
  automatic determining and extracting of said at least one pre-configured subset of said set of future plan data from contract data.

Following that, it is possible to provide a large number of contract data as part of the data-base, and said contract data can be provided as pdf-files, text-files, picture-files, such as jpeg-files, sql-files, xml files, etc. Using specific methods and/or routines, single or multiple elements of said files can be determined and extracted from said files. As an example, said contract data can comprise a text-file of a rent-contract. Using a specific algorithm and/or method and/or routine said text-file can be examined, and e.g. a value of a rent and/or a contracted time period of said rent and/or a contracted increase of said rent, etc can be extracted automatically.

According to a further embodiment, said at least one estimate value is calculated using the equation:

$$DCF_c = \sum_{t=1}^{\infty} \frac{f_c(t_0 + t)}{(1 + i_{t_0+t})^t}; \quad f_c(t) := \hat{\beta}_0$$

wherein
$i_t$ represents a market traded interest at time index t and
$t_0$; $0 \leq t_0 \leq n$ represents the index of a predetermined date.

$\hat{\beta}_0$ represents the statistical estimator for parameter $\beta_0$ and/or wherein said at least one estimate value (80, 108) is calculated using the equation:

$$DCF_l = \sum_{t=1}^{\infty} \frac{f_l(t_0 + t)}{(1 + i_{t_0+t})^t}; \quad f_l(t) := \hat{\beta}_0 + \hat{\beta}_1 t,$$

wherein
$i_t$ represents a market traded interest at time index t and
$t_0$; $0 \leq t_0 \leq n$ represents the index of a predetermined date.
$\hat{\beta}_0$ represents the statistical estimator for parameter $\beta_0$
$\hat{\beta}_1$ represents the statistical estimator for parameter $\beta_1$
and/or wherein said at least one estimate value (82, 110) is calculated using the equation:

$$DCF_n = \sum_{t=1}^{\infty} \frac{f_n(t_0 + t)}{(1 + i_{t_0+t})^t}; \quad f_n(t) := \hat{\beta}_0 + \hat{\beta}_1 t^{\beta_2},$$

wherein
$i_t$ represents a market traded interest at time index t and
$t_0$; $0 \leq t_0 \leq n$ represents the index of a predetermined date.
$\hat{\beta}_0$ represents the statistical estimator for parameter $\beta_0$
$\hat{\beta}_1$ represents the statistical estimator for parameter $\beta_1$
$\hat{\beta}_2$ represents the statistical estimator for parameter $\beta_2$.

In the above, $DCF_c$ relates to a constant DCF approach, $DCF_l$ relates to a linear DCF approach and $DCF_n$ relates to a non linear DCF approach.

Following that, as specific examples, one estimate value, two estimate values or three estimate values can be provided by the method. Said estimated values can be calculated, using different equations, as described above. Said equations represent different specific methods of processing said large number of data provided in said data-base(s). Following that, using said large number of data one parameter can be generated, which is the estimate value. Alternatively, two parameters can be generated, which are two estimate values or three parameters can be generated, which are three estimate values. Using said one, two, three estimate values the business unit can be evaluated by a human person using said computerized method in a simple and effective manner. In particular, a very good evaluation is possible by comparing two or three estimate values. Consequently, an efficient way of processing and evaluating a large amount of data is possible. In particular, it is possible to provide an automatic way of processing data, which then can be evaluated manually. Without said computerized method, an automatic evaluation of said large number of data would not be possible. In particular, is possible to provide an automated processing of data of a business unit, which can otherwise not be processed and evaluated. Moreover, said at least one estimate value allows a comparison of different business unit, which could otherwise not be compared. Hence, an automated method is provided for comparing two or more business units. In particular, the comparison of said at least one estimate value per business unit can be carried out automatically, as well. A result of said comparison can be displayed.

The term $\beta_0$ can e.g. be a conventional DCF value.

According to a further embodiment for the at least one estimate value, a limit factor $l_m$ is calculated using the equation:

$$l_m := \frac{DCF_m^r}{f_m(t_0 + 1)}.$$

The limit factor $l_m$ can also be referred to as the limit m. In particular, the non-linear approach and the linear approach can be easily compared in an automated manner.

Moreover, the risk-premium can be chosen manually or automatically.

According to another embodiment, a risk-premium is between approx. 80% and approximately 99%, in particular approximately 95%. In other words, the value of the risk premium RP can be chosen manually.

According to another embodiment, said step of extracting said set of past data and said step of extracting said set of future plan data comprise the step:
displaying an activating device for simultaneously activating said extraction of at least one subset of said set of past data, and at least one subset of said future plan data.

In other words, e.g. on a display of said computer environment, a button can be displayed. When activating said button, e.g. by a pointing device, such as a mouse, a track ball, a touch pad, etc., at least one subset of said past data, and at least one subset of said future plan data are extracted simultaneously. Said at least one subset of said past data, and at least one subset of said future plan data can be referred to as a category of the past data and a category of the future plan data. Moreover, multiple categories of the past data and multiple categories of the future plan data can be extracted simultaneously. As an example, maintenance cost data, as an exemplary category of past data and the future plan data can be extracted simultaneously for the past and the future plan data.

According to another embodiment, said step of extracting said set of past data and said step of extracting said set of future plan data comprises:
displaying an activation device simultaneously activating said extraction of a plurality of subsets of said past data and plurality of subsets of said future plan data.

In other words, when e.g. a button, as a preferred activation device, is activated or selected, maintenance data and/or rent data, etc. can be selected and provided. As a further subset, when activating said button, value adjustment data, etc., as a further subset of past data and future plan data can be provided for the past and future plan data, simultaneously.

According to a further embodiment, after extracting said at least one set of past data and said at least one set of future plan data, said data are displayed to a user for manual inspection.

In other words, all or a fraction of said extracted past data and said extracted future plan data is displayed to the user. Such a display can be carried out in form of a large table or a number of tables. Although, as described above, a manual evaluation of the business unit is hardly or not possible for the user due to the large number of data, the user can verify single entries of said data. In particular, all the extracted past data and all the extracted future plan data can be displayed to the user. The user is able to change, in particular correct one or more of said past data and said future plan data.

According to a further embodiment, a choice of a present date is made manually and, after choice of the present date, the set of past data and the set of future plan data are determined automatically.

In other words, a large number of data is available, wherein not necessarily past data and future plan data are indicated as past or future plan data. Rather some or all of the data can be provided with a date. The user can choose the present date. Consequently, data having a date prior to the present date can be referred to as past data. Data having a date after the present date preferably is referred to as future plan data.

According to a further embodiment, a choice of a present interval is provided manually, wherein said set of past data is provided for a past interval and wherein said set of future plan data is provided for a future interval automatically.

In other words, the user can choose a present date. Further, the user can choose an interval of a past date. Such interval can e.g. be a number of years. As an example, the user can choose the interval for the set of past data of three years. An interval can also be one year. Hence, even though past data for e.g. the past 5, 10, 15, 20, etc. years can be available, the computerized method only uses the past data for the last three years, starting from the present date. Moreover, the user can choose an entire interval for the computerized method; e.g. such interval can be 5, 10, 15, 20, 25, 30, 40, 50, 70, 90, etc. years. When the user e.g. chooses/selects 50 years for the entire interval and selects as the interval for the set past data 3 years, the past data is extracted for the last 3 years. The future plan data is extracted for the next 47 years.

Alternatively, it is also possible, that the user does not set the entire interval, but sets the interval for the past data and also for the future plan data independently. As an example, the past data can be extracted for the last 3, etc. years. The future plan data can be extracted for the next 50, etc. years.

Following that, according to such an embodiment, the set of past data and the set of future plan data is automatically determined using the present date and said interval.

As a further alternative, e.g. every year can be referred to as an interval, and for a number of intervals the past data can be provided. As an example, for 5 years past data can be provided. For the time following said intervals, for which past data is provided, future plan data is provided. In this example, e.g. for the years 6 to 50, future plan data is provided. The user then can choose any interval he likes, e.g. interval number 4. Consequently, past data is provided for the intervals, e.g. the years 1 to 3. Future plan data is provided for the intervals 4 to 50. However, the future plan data for the interval, e.g. the year 6, not necessarily needs to be an estimation but can be data that is already given (strictly speaking as past data).

According to a further embodiment, for the future plan data an individual estimate value can be determined automatically for every time unit of said future interval.

In other words, for e.g. every year one or more estimate values can be determined. The term "determined" in the sense of the present application is referred to as calculated and/or estimated and/or taken from a table, etc. For every time unit, e.g. for every year, an individual estimate value can be determined. In particular, the estimate value can be calculated for a number of subunits of the business unit. The estimate value of the business unit can be calculated from the number of estimate values of the subunits of the business unit.

Computer Program Product

A further aspect of the present application relates to a computer program product, in particular stored in a computer readable medium or as a signal which, when loaded in the memory of a computer carries out the method according to the invention.

Computer Environment

Another aspect of the application relates to a computer environment for processing and displaying data of a business unit comprising:

a past data extractor which is adapted for extracting a set of past data of said business unit from a past data base, wherein the computer environment is a closed computer environment and wherein said extractor is adapted for introducing said set of past data into said closed computer environment a future plan data extractor which is adapted for extracting a set of future plan data of said business unit from a future plan data base and wherein said future plan data extractor is adapted for introducing said set of future plan data into said closed computer environment, wherein said future plan data extractor comprises:

a determinator which is adapted for automatically determining and extracting at least one preconfigured subset of said set of future plan data a remaining data extractor which is adapted for automatically extracting the remaining data of said future plan data from said data base an estimate value determinator which is adapted for determining at least one estimate value from said set of past data and said set of future plan data, using said closed computer environment and a display which is adapted for displaying said determined estimate value.

Further Embodiments of the Computer Environment

According to an embodiment, said future plan data extractor, in particular said determinator of said future plan data extractor comprises a reader, which is adapted for automatically reading contract data, wherein said determinator is adapted for automatically determining and extracting said at least one pre-configured subset of said set of future plan data and said contract data.

According to a further embodiment, said displays adapted to display said past data and said future plan data.

According to a further embodiment, said display is adapted to display at least one estimate value.

Moreover, the present application can also relate to a method for determining a value of a business unit, comprising the steps:

providing past data of the business unit for a given first period of time in the past;

providing future plan data of said business unit for a given second period of time in the future;

determining from the past data and the future plan data at least one value of the business unit using one or more business-calculation-models of the set comprising constant business-calculation-model and a linear business-calculation-model and a non-linear business-calculation-model.

As an example, the past data of the business unit and/or the future plan data of said business unit are extracted from an external database. The past data can comprise data of the business unit from the past, up to now. The future plan data can comprise e.g. assumptions of the business unit for the future.

As a further example, the business unit includes one or more rental objects.

According to an embodiment, the determination of said value of said business unit includes at least one of planning positions and profit center groups.

According to another embodiment, said method includes at least one of the following five categories of plan positions:

revenues;
   operating costs;
   maintenance;
   building operation; and
   building administration, wherein said five categories constitute a cash flow.

In a further embodiment, the future plan data includes individual rental contract data of the business unit.

Exemplary, at least one of the past data of the business unit and the future plan data of said business unit are provided on an annual basis.

Further exemplary, said value of said business unit includes a discounted cash flow.

In another example, for calculating the discounted cash flow, market traded annual interest rates are taken into account for a period of 50 years.

According to an embodiment, using said constant business-calculation-model said discounted cash flow, as a specific value of said business unit is calculated using the equation:

$$DCF_c = \sum_{t=1}^{\infty} \frac{f_c(t_0+t)}{(1+i_{t_0+t})^t}; \quad f_c(t) := \hat{\beta}_0$$

wherein $i_t$ represents a market traded interest at time index t and
$t_0$; $0 \leq t_0 \leq n$ represents the index of a predetermined date.
$\hat{\beta}_0$ represents the statistical estimator for parameter $\beta_0$.

According to a further embodiment, using said linear business-calculation-model said discounted cash flow, as a specific value of said business unit is calculated using the equation:

$$DCF_l = \sum_{t=1}^{\infty} \frac{f_l(t_0+t)}{(1+i_{t_0+t})^t}; \quad f_l(t) := \hat{\beta}_0 + \hat{\beta}_1 t,$$

wherein $i_t$ represents a market traded interest at time index t and
$t_0$; $0 \leq t_0 \leq n$ represents the index of a predetermined date.
$\hat{\beta}_0$ represents the statistical estimator for parameter $\beta_0$
$\hat{\beta}_1$ represents the statistical estimator for parameter $\beta_1$.

Furthermore, using said non-linear business-calculation-model said discounted cash flow, as a specific value of said business unit can be calculated using the equation:

$$DCF_n = \sum_{t=1}^{\infty} \frac{f_n(t_0+t)}{(1+i_{t_0+t})^t}; \quad f_n(t) := \hat{\beta}_0 + \hat{\beta}_1 t^{\hat{\beta}_2},$$

wherein $i_t$ represents a market traded interest at time index t and
$t_0$; $0 \leq t_0 \leq n$ represents the index of a predetermined date.
$\hat{\beta}_0$ represents the statistical estimator for parameter $\beta_0$
$\hat{\beta}_1$ represents the statistical estimator for parameter $\beta_1$
$\hat{\beta}_2$ represents the statistical estimator for parameter $\beta_2$.

Moreover, the future cash flow developments can be compared by calculating the limit factor $l_m$ using the equation:

$$l_m := \frac{DCF_m^r}{f_m(t_0 + 1)}.$$

Further to that, the present application can relate to a computer program product in particular stored in a computer readable medium or as a signal which, when loaded in the memory of a computer carries out the above method(s).

Moreover, the application may relate to a computer environment for determining a value of a business unit, comprising:
- a past data provider for providing past data of the business unit for a given first period of time in the past;
- a future plan data provider for providing future plan data of said business unit for a given second period of time in the future and
- a determinator for determining from the past data and the future plan data at least one value of the business unit using one or more business-calculation-models of the set comprising a constant business-calculation-model and a linear business-calculation-model and a non-linear business-calculation-model.

In particular, the computer environment can comprise means necessary for carrying out the above method and/or the above methods.

DESCRIPTION OF THE FIGURES

One or more embodiments of the present application are described in the following with reference to the Figures, wherein there is shown in
- FIG. 1: an exemplary display of data;
- FIG. 6: an exemplary display of data;
- FIG. 7: an exemplary display of data;
- FIG. 11: an exemplary display of data;
- FIG. 12: an exemplary display of data;
- FIG. 15: an exemplary display of data,
- FIG. 18: an exemplary display of data;
- FIG. 20: an exemplary display of data;
- FIG. 21: an exemplary display of data,
- FIG. 25: an exemplary display of an evaluation.

FIG. 1 shows an exemplary display of data according to an embodiment of the present application. Particularly, FIG. 1 can show a representation of a graphical user interface as part of an embodiment of the computerized method. More particularly, FIG. 1 shows a variety of activation devices 10 which can be used for extracting past and future plan data. Moreover, FIG. 1 shows a number of data 12. The data can comprise past data 14 and future plan data 16 of one or more subunits of a business unit. As an example, the business unit can be referred to as "GEWOFAG". The subunits can be one or more apartment buildings, e.g. referred to as "WE201—Fürstenried I", "WE202—Fürstenried I", "WE203—Fürstenried I", . . . "WE222—Käpfelstr. 14-16". Consequently, according to FIG. 1, data for determining cash flow on annual basis can be provided. In particular, past data for 5 years, namely the years 2002, 2003, 2004, 2005, 2006, is provided. Moreover, future plan data for 6 years, namely "Plan 2007", "Plan 2008", "Plan 2009", "Plan 2010", "Plan 2011", and "Plan 2012" is provided. Said past data and said future plan data can be extracted from a data base. Particularly, said data can be loaded from said data base. Moreover, all conditions for rent-contracts can be simulated and loaded. Thereby, each document (also referred to as evidence, slip, voucher, record, etc.) in the profit centre calculation can be used as a data basis or as a data in a data basis for planning. The term "profit centre" can be used for the described method and/or the computer program implementation thereof.

Using basis-data (also referred to as "Stammdaten") credit/advance management and investment/capital accounting positions in a balance are planned. Possibly, the data can be manually corrected and/or adapted. Following that, planned data on an annual basis are determined, in particular, defined.

Figure 1:
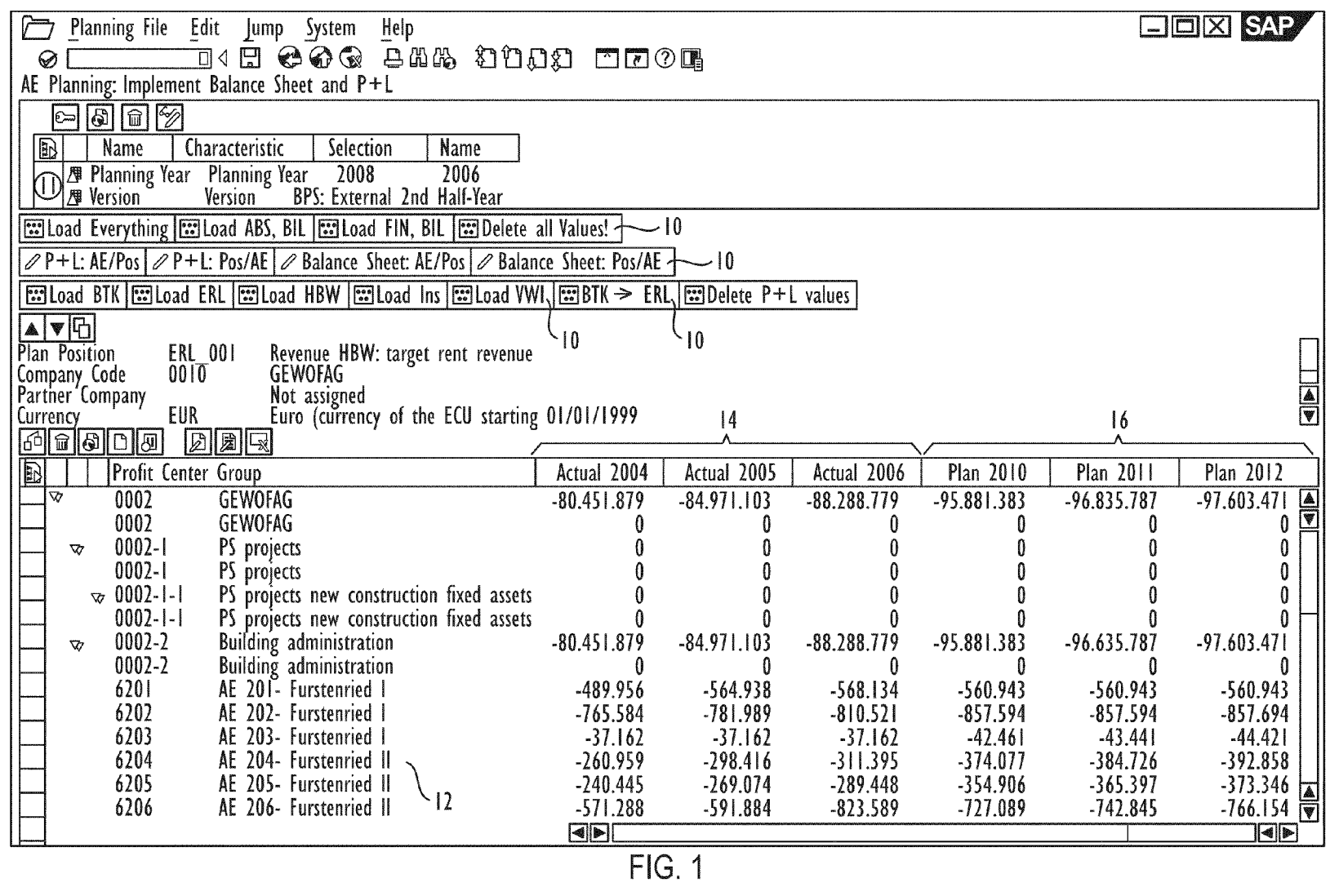
Figure 2:
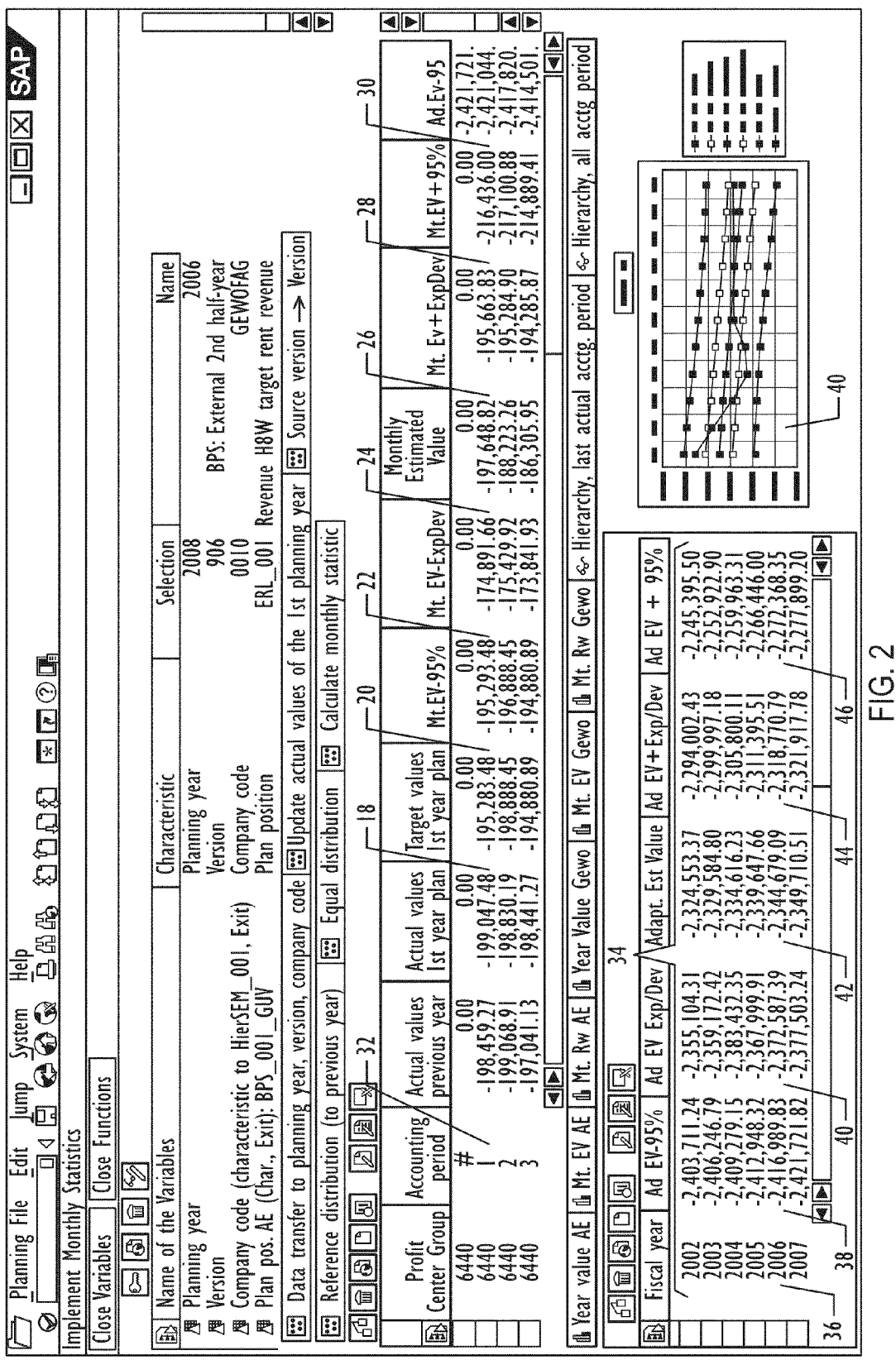
- FIG. 2: an exemplary display of data.

As shown in FIG. 2, the future plan data per year, as shown in FIG. 1, can be divided in future plan data on a monthly basis. Moreover, during the course of the current year, the monthly future plan data can be exchanged by current data, i.e. data as actually received per year. As seen in FIG. 2, the current values for the first year are shown in column 18. In column 20 the future plan data for the current year is shown. In the subsequent columns 22 to 30, monthly desired values are shown in specific intervals. As an example, in columns 22 and 30 there are shown the monthly desired values within a 95% confidence interval. In other words, every line represents a month of the first year. Following that, lines 1 to 5 (see column 32) are already provided with current values. Also for a said numbers, there are provided future plan data (reference is made to column 20). In columns 24 and 28 there is provided the monthly desired value according to the expectation variance. For details see below, in particular see section "Mathematics". In column 26 there is provided a monthly estimate value. Using said monthly values, as shown in columns 28 to 30, estimated values can be calculated on a yearly basis, as shown in table 34. Particularly, in column 36 the years are indicated. In columns 38 and 46 the estimate values per year are shown, comparable to the monthly estimated values according to columns 22 to 30. In other words, in columns 38 and 46 there is shown the yearly desired value. In particular the lower 95% boundary and the upper 95% boundary are shown in Tables 38 and 46. In columns 40 and 44 the yearly desired value according to expectation variance are shown and in column 42 the yearly estimated value is shown.

In graph 48 the values of table 34 are plotted. Particularly, graph 48 can provide a very effective warning system for determining and showing, whether the wanted values are reached or not.

Figure 3:
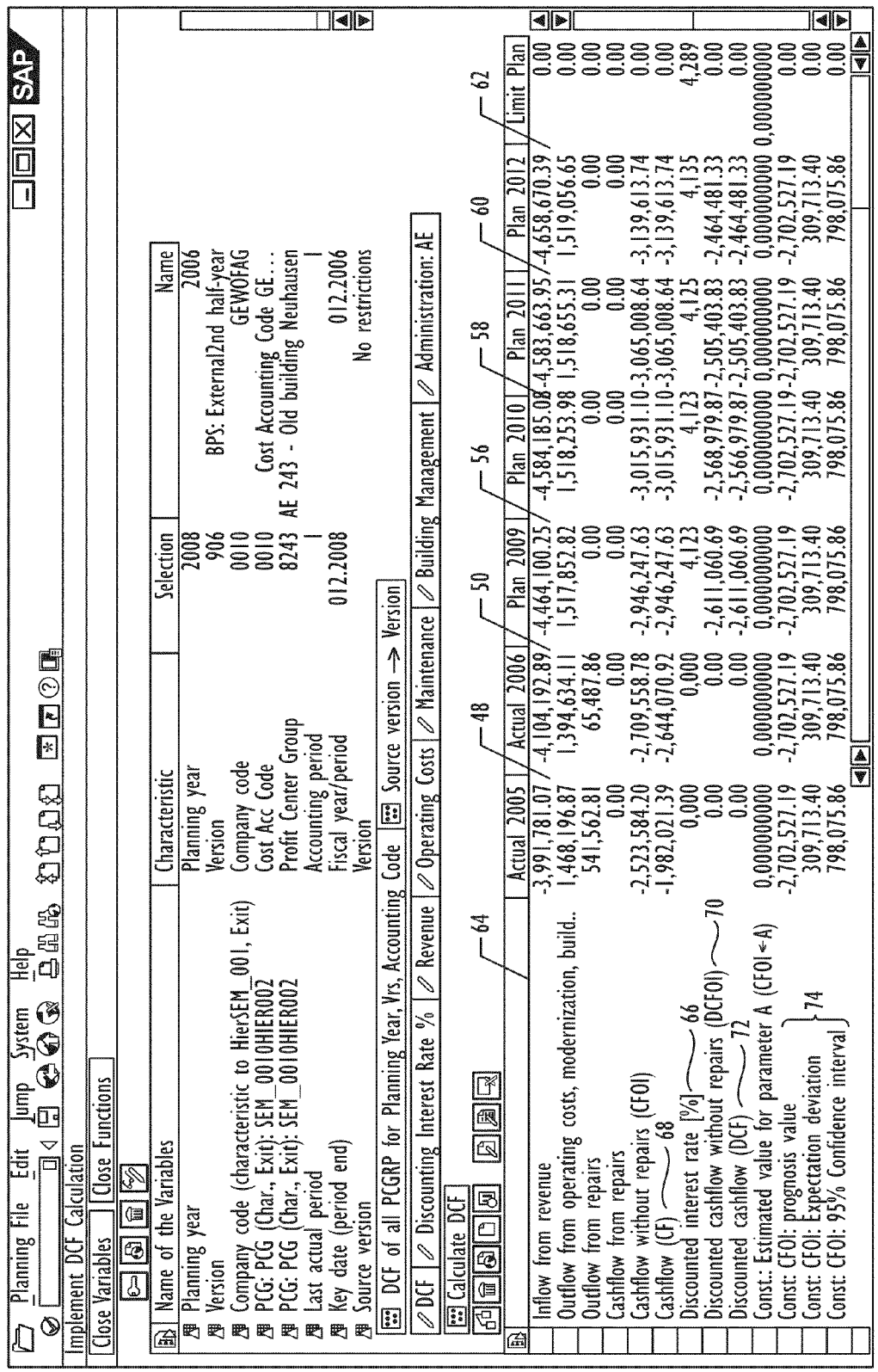
- FIG. 3: an exemplary display of data.

FIG. 3 shows an exemplary graphical interface for providing the estimate value per year. The estimate value can be referred to as a "discounted cash flow"-value (referred to SDCF-value). In particular, in FIG. 3 there are shown past data in column 48 and 50, referred to as "Actual 2005", and "Actual 2006". Further, there are shown future plan data for the subsequent 4 time periods, referred to as "Plan 2009" in column 56, "Plan 2010" in column 58, "Plan 2011" in column 60, and "Plan 2012" in column 62. Column 64 refers to a description of the specific value of the respective columns 58 to 62.

Particularly, as a part of the future plan data, discounting interest rates can be provided. In other words, the discounting interest rates can form a subset of the future plan data. The discounting interest rates are shown in line 66. Preferably, the discounting interest rates can be provided for the next 50 years. More particularly, the discounting interest rates can be guaranteed for the next 50 years.

Using said data, the cash flow can be calculated on an annual basis. Possible cash flows are shown in lines 68, 70 and 72. In line 68 the cash flow is shown, wherein for a future cash flow discounting interest rates are not taken into account. In line 70 the discounted cash flow is shown, however without any restoration and/or service and/or corrective maintenance of the respective business unit or subunit. In line 72 the discounted cash flow is shown.

In line 74 different values of the discounted cash flow as a specific estimate value, as the discounted cash flow is calculated according to different embodiments of the present application. Moreover, different deviations are shown, such as the deviation according to expectation variance, the deviation according to a 95% confidence interval, etc.

Figure 4:
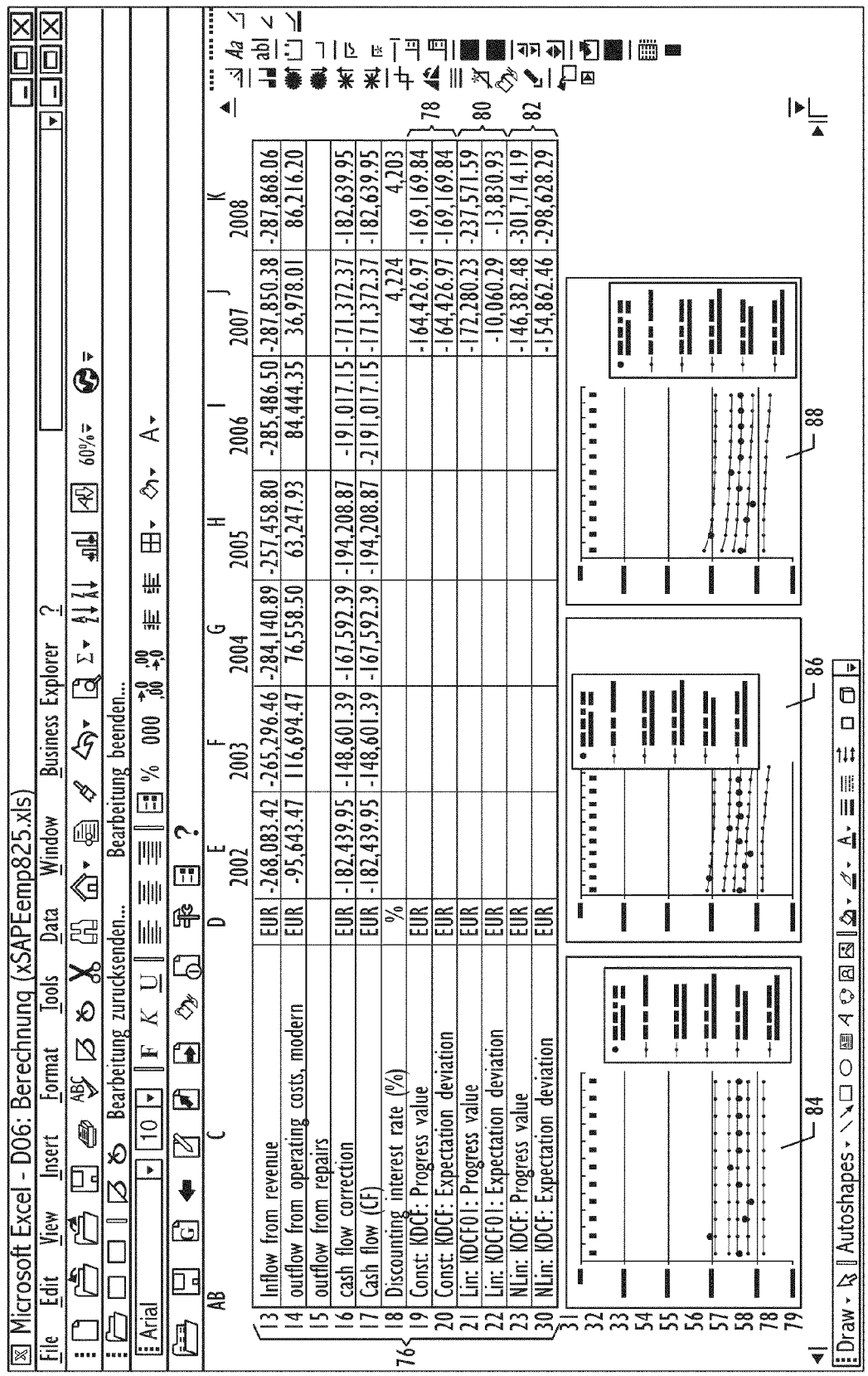
- FIG. 4: an exemplary display of data.

FIG. 4 shows a table 76 comprising values of discounted cash flows, calculated according to different embodiments of the present application. Particularly, in sub table 78, the discounted cash flow is calculated according to a constant model using the equation:

$$DCF_c = \sum_{t=1}^{\infty} \frac{f_c(t)}{(1+i_t)^t}; \quad f_c(t) := \hat{\beta}_0.$$

In sub table 80 the discounted cash flow is shown which is calculated according to a linear model using equation:

$$DCF_l = \sum_{t=1}^{\infty} \frac{f_l(t)}{(1+i_t)^t}; \quad f_l(t) := \hat{\beta}_0 + \hat{\beta}_1 t.$$

In sub table 82 the discounted cash flow is shown, calculated according to a non-linear model using the equation:

$$DCF_n = \sum_{t=1}^{\infty} \frac{f_n(t)}{(1+i_t)^t}; \quad f_n(t) := \hat{\beta}_0 + \hat{\beta}_1 t^{\hat{\beta}_2}.$$

Moreover, in the columns the discounted cash flow values are shown for different time periods. Particularly, the discounted cash flow is shown for the future plan data of the years 2007, 2008, 2009, 2010, 2011, and 2012. Accordingly, in graphs 84, 86, 88 there are shown the discounted cash flow values and also the respective deviation difference. Graph 84 shows the discounted cash flow value and its evolution for the next 11 time periods, using a constant calculation model (see above). Graph 86 shows a discounted cash flow value and its evolution for the next 11 time periods, using a linear calculation model (see above). Graph 88 shows the discounted cash flow value and its evolution for the next 11 time periods, using a non linear calculation model (see above). Accordingly, in graphs 86, 88 the deviations are shown.

Figure 5:
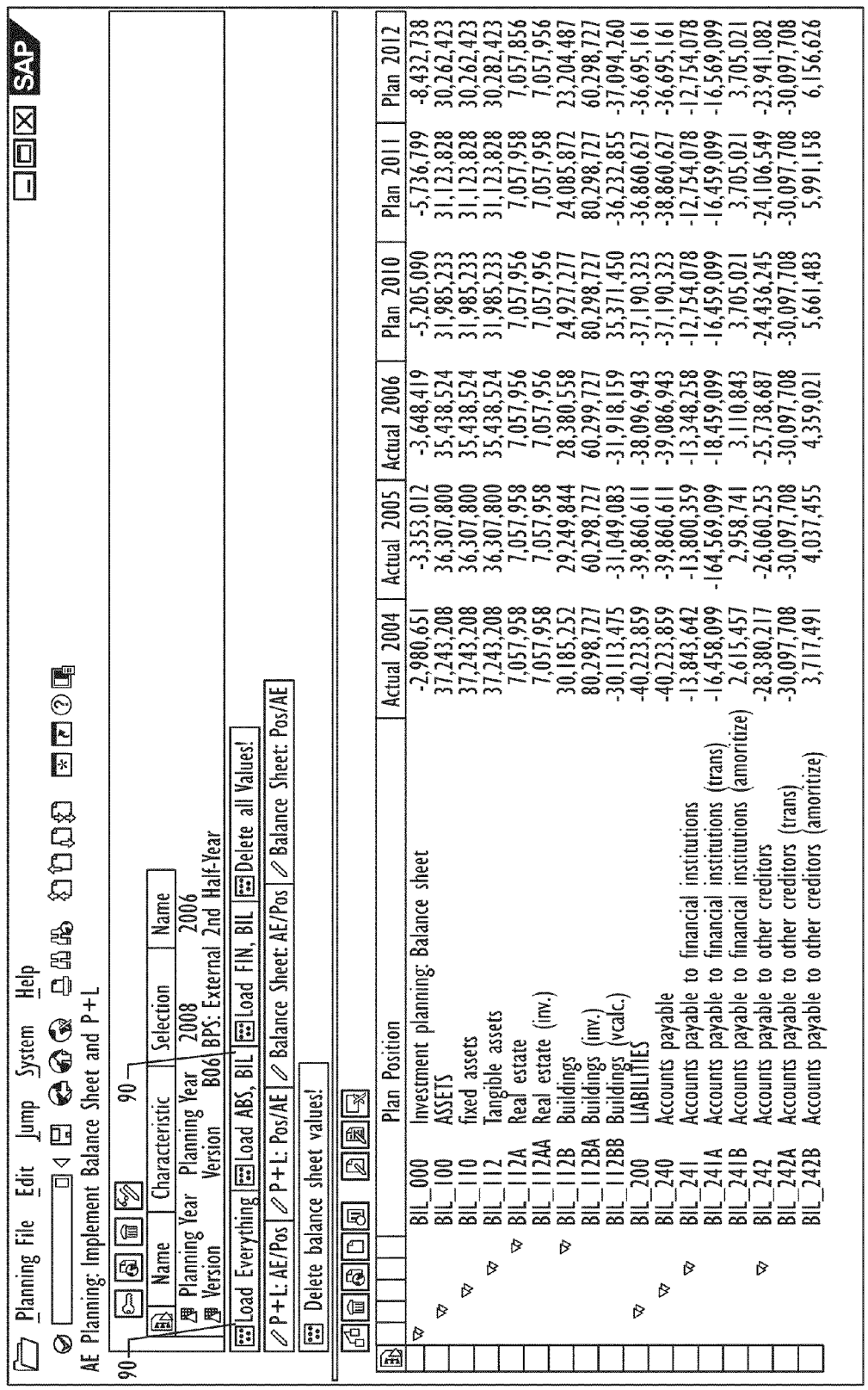
- FIG. 5: an exemplary display of data.

In the following, a detailed description of the calculation of the discounted cash flow values is provided. In particular, FIG. 5 shows a graphical user interface for providing past data and future plan data. Exemplary, FIG. 5 shows a graphical user interface having buttons 90, which can be used for loading specific balance values. Said balance values can comprise past data and future plan data. In the table in FIG. 5 there are provided past data for the years 2002 to 2006 and future plan data for the years 2007 to 2012, as mere examples of a method according to the present application. Exemplary, past data and future plan data are extracted simultaneously when activating one or more of buttons 90. Accordingly, using the buttons 90, in particular using buttons 90, referred to as "Lade ABS, BIL" and "Lade FIN, BIL", all the relevant data for real estate objects are provided from the investment accountancy and the credit management. Said data can be loaded from a data base and planning can be made with said data. In particular, said data can comprise bonds, liabilities, amortizations, liquidation, interest rates, acquisition and manufacturing costs, (value) adjustments, (accumulated) depreciation, provision for depreciation, accrual, etc. Moreover, profit and loss values can be provided by extraction from a data base. Particularly, said values can be provided by loading from a data base. The profit and loss values can particularly be provided using buttons 92. Said data are shown in FIG. 6, which represents a view of a screen shot/graphical user interface (GUI), as shown in FIG. 5, at a later stage in time. Particularly, the lines comprising data referred to as "ERL_001" to "ERL_013", are subject of the specific planning functions and rules, which are exemplary described in the following (in particular referred to as sections 1.1.1.1. to 1.1.1.6. and sections 1.1.2. to 1.1.7.3.):

1.1.1.1. PF Download OPC (Operating Costs Expenditure) Planning Rules for Portfolio Planning The planning function 'download OPC (operating costs expenditure)' initiates the function module Z_BPS_002_RFC_CONS in the source system.

In order to transfer to BPS (which is an abbreviation of business planning and simulation) from the profit centre calculation, the function module selects the actual values of the past window, i.e. of the past five years including the planning year, limited to all of the OPC accounts. We identify as an OPC account all types of cost which are allocated to those plan items (TA ZBPS005) which are allocated to plan item type 'OPC' (TA ZBPS004).

The allocation of the OPC items to the cost types is not arbitrary, but the extractor attributes different levels of significance to the individual plan items. He also requires a fixed scheme for allocating plan items to cost types (TA ZBPS005), without however checking its correctness. The user is responsible for this. The allocation logic is as follows:

The item

OPC_001 (EU rates)

combines the three accounts which are allocated in the source system in the account locator of the incidental cost account (Table TIV80) to the rates account (OPC_009) in the 'Accounts for the distribution of net incidental costs' block, to the item 'Offset account RA' for the apportionable part, to the item 'Offset account RA' without further settlement' for the non-apportionable part, and to the item 'Offset account RU' for vacancy.

OPC_002 (EU operating costs)

similarly to OPC_001 combines the three accounts which are allocated in the source system in the account locator of the incidental cost account to the operating costs account (OPC_010) in the 'Accounts for the distribution of net incidental costs' block.

OPC_003 (EU heating costs)

similarly to OPC_001 combines the three accounts which are allocated in the source system in the account locator of the incidental cost account to the heating costs account (OPC_011) in the 'Accounts for the distribution of net incidental costs' block.

OPC_004 (non-deductible input tax)

combines all of the accounts which are allocated in the source system in the account allocator of the incidental cost account to the three accounts for rates, operating costs and heating costs in the 'input tax' block in the 'Offset account—non-deductible input tax' field.

OPC_005 (credit—rates)

refers to the account which is allocated in the source system in the account locator of the incidental cost account to the rates account in the 'Credit—accounting units' block in the 'Credit account AU' field.

OPC_006 (credit—operating costs)

refers to the account which is allocated in the source system in the account allocator of the incidental cost account to the operating costs account in the 'Credit—accounting units' block in the 'Credit account AU' field.

OPC_007 (credit—heating costs)

refers to the account which is allocated in the source system in the account locator of the incidental cost account to the heating costs account in the 'Credit—accounting units' block in the 'Credit account AU' field.

OPC_008 (credit—non-deductible input tax)

combines all of the accounts which are allocated in the source system in the account locator of the incidental cost account to the three accounts for the rates, operating costs and heating costs in the 'input tax' block in the 'Credit—non-deductible input tax' field.

OPC_009 (AU rates)

refers in the source system in the account locator of the incidental costs account (Table TIV80) to the rates account.

OPC_010 (AU operating costs)

relates in the source system in the account locator of the incidental costs account (Table TIV80) to the operating costs account.

OPC_011 (AU heating costs)

relates in the source system in the account locator of the incidental costs account (Table TIV80) to the heating costs account.

OPC_012 (miscellaneous)

includes all of the operating costing accounts which are not involved in the allocation to economic units, but are entered under companies.

The scheme divides the plan items into three groups:

debiting of the accounting units (OPC_009-OPC_012), crediting of the accounting units (OPC_005-OPC_008), debiting of the economic units (OPC_001-OPC_004).

Background: The operating costs are recorded in accounting units (AU) and from here passed on to rental units (RU) and rental agreements (RA). The accounting to the rental units and rental agreements is partially implemented according to a complicated attribution scheme. Only for some accounting units is there a 1:1 relationship to economic units, whereas the rental units and rental agreements are directly allocated to the economic units. We require the plan values, but on the level of the economic units because the operating costs are introduced into the DCF calculation on this level. Therefore, for the planning we consider the actual values after (and not before) accounting to the rental units and rental agreements. The advantage of this approach is the logically tidy allocation of the operating costs, even if there is a year's time offset: Relevant to the invoice date (year of entering the debit in RU and RA) is the cost collector as an account assignment object. When entering a debit in the AU, the reference date is also given. By means of the reference date the correct cost collector is drawn in. Each year there is a new cost collector for each AU. The incidental costs settlement takes place once a year and always relates to exactly one year (reference year). However, the date of entering the debit in the AU can, but does not have to fall in the year following the settlement. Therefore, one can expect stronger fluctuations in the debit accounts of the AU. A disadvantage with this approach is that the offset accounts of the rental units and rental agreements (plan items OPC_001-OPC_004) and the credit accounts of the AU (plan items OPC_005-OPC_008) are not only allocated to the three AU accounts for rates, operating costs and heating costs (plan items OPC_009-OPC_012), but to further secondary cost types (such as lift attendant activities, heating maintenance). In this way a non-differentiated picture is formed for the economic units.

In the first step the extractor considers the plan items of the debit of the economic units (OPC_001-OPC_004), and does not do so aggregated on the overall level, but in detail on the EU level, and executes the following calculations:

debit EU, displayed directly on EU and the rest on top level Gewofag (0002) in ACTUAL and PLAN (OPC_001-OPC_004)

credit AU, displayed directly on EU, in the PLAN (OPC_005-OPC_008)

For this, for the plan items OPC_001-OPC_004 he takes the actual values from the profit centre calculation and consolidates the values of the 16 periods to the annual level, the accounts to the allocated plan items and each profit centre to the allocated profit centre group. If for one profit centre there does not exist a profit centre group of an economic unit, the function module consolidates to the top profit centre group 'Gewofag' (0002).

The actual values form the data base for estimating the plan values. We revise this data base: We only incorporate feature combinations—plan item, profit centre group, accounting area and currency key into the data base if they have actual values over the whole, maximum span for each plan item of the past window. For each of these combinations of features we calculate the inaccuracy as a maximum percentage deviation of the estimated values from the actual values. We now re-sort the data base according to these inaccuracies and calculate for the more accurate half the average trend and the maximum for the maximal deviations for each plan item. We then calculate for each plan item with a separate linear ansatz, but all (profit centre groups of the) economic units with the same trend. We understand trend here as being the percentage increase of the estimated value of the last actual year to the estimated value of the first plan year. According to the information given by the specialist field (Mr. Götz, Gewofag) it is senseless to apply a separate trend for each economic unit. For the estimate we apply the following rules:

Outgoing Rule:

If in the last actual year of the extracted time series no actual value has accrued for an economic unit for a plan item, we update the plan values 0 in the planning horizon.

Incoming Rule:

If an actual value accrues for an economic unit in the final actual year of the extracted time series, in the estimate we take into account the date of use for the first time (TA FOE3) of the allocated rental units (Tab VIMI01). With newly added EUs, in the following year one should count on operating costs at the level of the reciprocal value (13−incoming period)/12. If, for example, all of the rental units of an EU were newly added on 1.10, in the following year one should count on operating costs of four times the level.

Trend Deviation Rule:

In order to keep structural interruptions, i.e. exceptional influences in the past, out of the estimate, we apply the trend deviation rule: Each set of data includes a plan item into which we calculated the average trend t and the maximum inaccuracy i covering the above accounting area and profit centre groups. For one set of data we calculate the plan values according to the method of the smallest squares on the additional condition that trend=t. If the maximum deviation exceeds i we recursively remove the oldest actual value from the data base until both conditions are met. This is the case at the latest if just one actual value is still present in the data base.

In the plan we then also update for each profit centre group of the economic unit, but not for the top level Gewofag (0002), the plan items of the credit of the accounting units (OPC_005-OPC_008), and with prefixes which are reversed in relation to the corresponding item of the debits EU (OPC_001-OPC_004). On the top level Gewofag (0002) we implement a delta calculation (see below) for the plan values of items OPC_005-OPC_008. We only display a summary of the actual values for plan items OPC_005-OPC_012 on the top level Gewofag (0002):

In the second step the extractor considers the debiting and crediting of the accounting units (OPC_005-OPC_012), and does not do so in detail on the EU level, but aggregated on the company level, and executes the following calculations:
credit AU in total shown over all profit centre groups on top level Gewofag (0002) in ACTUAL (OPC_005-OPC_008)
debit AU in total shown over all profit centre groups on top level Gewofag (0002) in ACTUAL (OPC_009-OPC_012)
credit AU directly on top level Gewofag (0002) PLAN (OPC_005-OPC_008)
debit AU in total shown over all profit centre groups on top level on top level Gewofag (0002) PLAN (OPC_009-OPC_012)

For this, for item positions OPC_005-OPC_012 he takes the actual values from the profit centre calculation and consolidates
the values of the 16 periods to the annual level,
the accounts to the allocated plan items and
each profit centre to the top profit centre group 'Gewofag' (0002).

On this data base we estimate for each plan item, covering the whole accounting area, the linear trend over all selected actual values (OPC_001-OPC_012), and in so doing apply the following rules:

Completeness Rule:

Incomplete annual values falsify the estimate. With items OPC_009-OPC_012 the values for the current year may not be present in their entirety. We therefore blank out the current year for the estimate. Values for the remaining (accounting) items OPC_001-OPC_008 are either complete or not available at all. The problem does not arise here.

Trend-Capping Rule:

If the trend exceeds the constant c_maxtrend or falls short of the constant c_mintrend, we assume that at least the last (linearly estimated) plan value is set too high (c_maxtrend) or too low (c_mintrend). We therefore limit the trend. With the estimate on the EU level (OPC_001-OPC_004) the problem does not arise due to the broader data base. Therefore, we do not apply the rule here.

Average Value Rule:

We basically estimate the 'miscellaneous' item (OPC_012) with the average value, i.e. with trend specification 0 due to strong fluctuations.

With the subsequent estimate on the company level with the trend specification and dependent upon the accounting area and the plan item we then apply the following rules:

Trend-Adaptation Rule:

With the items
'rates' (OPC_001, OPC_005, OPC_009)
'operating costs' (OPC_002, OPC_006, OPC_010)
'heating costs' (OPC_003, OPC_007, OPC_011)
'non-deductible input tax' (OPC_004, OPC_008)
for each group respectively we use the most accurate trend. Within these four groups, on the advice from the specialist field we can apply respectively identical trends.

Trend Deviation Rule (See Above)

We estimated plan items OPC_005-OPC_012 in total on the company level. It must now be taken into account that we have already updated plan items OPC_005-OPC_012 on the EU level. Therefore, on the company level we apply the difference between the company total−EU total if the company total exceeds the EU total. Otherwise we update value 0 here.

1.1.1.2. PF Download INC (Income)

The planning function 'download INC (income)' initiates the function module Z_BPS_003_RFC_CONS in the source system.

In order to transfer to BPS from the profit centre calculation, the function module selects the actual values of the past window, i.e. of the past five years including the planning year, limited to all of the INC accounts. We identify as an INC account all types of cost which are allocated to those plan items (TA ZBPS005) which are allocated to plan item type 'INC' (TA ZBPS004). The function module consolidates
the values of the 16 periods to the annual level,
the accounts to the allocated plan items and
each profit centre to the allocated profit centre group. If for one profit centre there does not exist a profit centre group of an economic unit, the function module consolidates to the top profit centre group 'Gewofag' (0002).

By means of the actual values we calculate the vacancy quota as the quotient INC_004 (calc. income vacancy)/(INC_001 (desired rents)+INC_004).
over all economic units and actual years of the past period. We apply this quota when calculating the plan values for the individual economic units. It is senseless to establish the vacancy quote for each economic unit due to irregular modernisation costs and missing operators. Therefore, we also dispense with a trend calculation.

In order to calculate the plan values we differentiate according to the plan item. We calculate plan items
INC_001 (desired rents)
INC_003 (own use)
for each rental unit and from this deduce the values for the following plan items:

INC_004 (calc. income vacancy) proportional to the vacancy quota
INC_006 (calc. expenditure vacancy) with reversed prefix in relation to INC_004
INC_007 (occupancy costs rent own use) with reversed prefix in relation to INC_003.
In order to distinguish between INC_001 (desired rents) and INC_003 (own use) we differentiate for each rental unit according to the occupancy type. If occupancy type I0129 (corporate use with RA) or I0130 (own use) is allocated to the rental unit, we add its plan income to plan item INC_003 (own use) or else to plan item INC_001 (desired rents). We calculate the plan income dependently upon the type of use which is clearly allocated to the rental unit. An increase, a capping and an exceedance rule is respectively precisely allocated to each type of use (TA ZBPS030). With these rules we calculate the plan income for the planning horizon and aggregate the rental units to their economic units. The calculated plan values are still unrealistic because they are based upon full rental. Therefore, we apply the above vacancy quota calculated from the actual to each economic unit to plan item INC_001 (desired rents) in order to calculate plan item INC_004 (calc. income vacancy) and deduct this value from INC_001 (desired rents) again. We finally update INC_006 (calc. expenditure vacancy) and INC_007 (occupancy costs rent own use) with a reversed prefix in relation to INC_004 (calc. income vacancy) and INC_006 (calc. expenditure vacancy).

Whereas we only calculate the plan values for plan items
INC_008 (rates):
INC_009 (operating costs)
INC_010 (heating costs)
INC_011 (non-deductible input tax.)
in the BPS (from plan items OPC_001 to OPC_004), the extractor establishes the remaining plan items
INC_002 (turnover rent/other income)
INC_005 (balance figure/income curtailment)
INC_012 (allocation deficit risk)
INC_013 (rent/expenditure allowance)
according to the outgoing rule and the trend capping rule in the source system.
Outgoing Rule:
If in the last actual year no actual value has accrued for an economic unit for a plan item, we update the plan value 0 for this item for each plan year. Due to entries which are still expected in the current year, we consider the minimum as the last actual year {current year−1; last selected actual year}.
Trend Capping Rule:
At all times an economic unit is precisely allocated to an accounting area, but can however also change this during the year. Therefore, we calculate the regression parameters linearly to cover the accounting area for each economic unit and plan item. In so doing we specify that the trend must not exceed the percentage c_maxpercent or fall short of the percentage c_minpercent.

The extractor calculates items INC_002 (turnover rent/other inc), INC_005 (balance figure/inc curtailment) and INC_012 (allocation deficit risk) with the capping constants c_maxtrend=5%, c_mintrend=−2%.

The extractor calculates item INC_013 (rent/expenditure allowance) with the capping constants c_maxtrend_inc13=−0.5%, c_mintrend_inc13=−3%.

The Trend is defined as the percentage increase from the estimated value of the last actual year to the estimated value of the first subsequent year.

As the first actual year of the data base we choose Max {2001; start of the past period} due to completing entries in 2000. Due to entries still expected in the current year we consider as the last actual year Min {current year−1; last selected actual year}.

With the regression parameters calculated for each economic unit and plan item we establish the plan value for each year of the planning horizon and update this value on the accounting area currently allocated to the EU.

1.1.1.3. PF Download PRM (Property Management)

The planning function 'download PRM (property management)' initiates the function module Z_BPS_013_RFC_CONS in the source system.

In order to transfer to BPS from the profit centre calculation, the function module selects the actual values of the past window, i.e. of the past five years including the planning year, limited to all of the PRM accounts. We identify as a PRM account all types of cost which are allocated to those plan items (TA ZBPS005) which are allocated to plan item type 'PRM' (TA ZBPS004). The function module consolidates
the values of the 16 periods to the annual level,
the accounts to the allocated plan items and
each profit centre to the allocated EU profit centre group. If for one profit centre there does not exist a profit centre group of an economic unit, the function module consolidates to the top profit centre group 'Gewofag' (0002).

The FM calculates the plan values according to the trend capping specification rule.
Trend Capping Specification Rule:
We calculate the trend linearly for each plan item to cover the accounting area and totalling over all profit centre groups. In so doing we specify that the trend must not exceed the percentage c_maxpercent and must not fall short of the percentage c_minpercent with c_maxtrend=3% and c_mintrend=−3%.

The Trend is defined as the percentage increase from the estimated value for the last actual year to the estimated value of the first subsequent year.

As the first actual year of the data base we choose Max {2000; 1$^{st}$ plan year−5} due to blurs in 1999. Due to entries which are still expected in the current year we consider as the last actual year Min {current year−1; last selected actual year=1$^{st}$ plan year−1}.

With the trend calculated for each plan item we establish the regression parameters for each economic unit such that they correspond to this trend, and from these parameters the plan value for each year of the planning horizon in order to update it on the accounting area currently allocated to the EU.

1.1.1.4. PF Download MAI (Maintenance, Modernisation, Renovation)

The planning function 'download MAI (maintenance/mod/ren)' initiates the function module Z_BPS_006_RFC_CONS in the source system.

For the transfer to BPS from the profit centre calculation, the function module selects the actual values of the past window, i.e. of the past five years including the planning year, limited to all of the MAI accounts. We identify as a MAI account all types of cost which are allocated to those plan items (TA ZBPS005) which are allocated to plan item type 'MAI' (maintenance/renovation/modernisation expenditure) (TA ZBPS004). The function module consolidates
the values of the 16 periods to the annual level,
the accounts to the allocated plan items and
each profit centre to the allocated EU profit centre group. If for one profit centre there does not exist a profit centre group of an economic unit, the function module consolidates to the top profit centre group 'Gewofag' (0002).

The FM calculates the Plan values for item MAI_001 (maintenance) according to the average value rule. We only update the average value for each economic unit on the active accounting area of the economic unit. On the remaining accounting areas we update the planning value 0. On the company level we update the plan values in the accounting area 0010. There is no active accounting area for this.

Average Value Rule:

We calculate the average value of the actual values in the period h_begyear; h_endyear]:=[Max{2000, i_pyear−5}; Min{current.previous year, i_pyear−1}] for each plan item ('MAI_001') and economic unit, covering the accounting area. We do not use the current year because the actual values may not yet be complete. The average value would then be calculated too low.

The FM takes the plan values for item MAI_002 (renovation/modernisation) from the annual budget values of the project system. Costs for modernisation and renovation under cost type '805042' statistically arise in projects, namely
costs for modernisation in projects which begin with the code MO,
costs for renovation with projects which begin with the code RE.

The four figures following the two-figure prefix generally define the economic unit to which the actual and plan values should additionally be added in the SEM-BPS (which is an abbreviation of strategic enterprise management-business planning and simulation):

E.g.: MO02040001 defines EU 204.

As an exception to this rule, a project can also relate to several economic units:

E.g.: MOA0T40002.

In this case the accounting rule for the true accounting object would have to be considered for the correct allocation to the economic units in question. Instead of this, we assign the values in SEM-BPS to the profit centre group '0002'.

We take the annual budget values as the approved plan values in SEM-BPS. (According to Mr. Kaiser, the total values of the budget are fully distributed over the year slices.) In contrast, a prognosis calculation does not take place for maintenance because the actual values are only produced at irregular intervals. Instead, the plan values are to be entered manually in SEM-BPS.

Remarks:

The accruals for building maintenance were inadvertently entered in the years 2000-2002 in account 805040 in periods 13-16. In 1999 they were inadvertently entered in account 805040 in period 12. One can no longer not divide these up here. For the years 2000-2002 however, we direct the values for the four particular periods 13-16 to plan item MAI_009 (ref: particular period maintenance 805040).

The two features relevant for the consolidation—partner's company ID and movement type are initially updated in the plan.

1.1.1.5. PF Download ADC (Administration Costs for EU)

The planning function 'download ADC (administration costs for EU)' initiates the function module Z_BPS_009_RFC_CONS in the source system.

In order to transfer to BPS from the profit centre calculation, the function module selects the actual values of the past window, i.e. of the past five years including the planning year, limited to all of the MAI accounts. We identify as a MAI account all types of cost which are allocated to those plan items (TA ZBPS005) which are allocated to the 'ADC' (administration) plan item type (TA ZBPS004). The function module consolidates
the values of the 16 periods to the annual level,
the accounts to the allocated plan items, and
each profit centre to the allocated EU profit centre group. If for one profit centre there does not exist a profit centre group of an economic unit, the function module consolidates to the top profit centre group 'Gewofag' (0002).

The FM calculates the plan values according to the trend capping rule. We only update the trend value for each economic unit on the active accounting area for the economic unit. On the company level we update the plan values in accounting area 0010.

Trend Capping Rule:

We calculate the trend in total over all of the economic units for each plan item and in the next step break it down into the individual economic unit. We do not include any values before the year 200 in the trend calculation, and no values for the current year. We limit the trend to the interval [c_mintrend; c_maxtrend].

1.1.1.6. PF OPC→INC (Operating Costs→Income)

The planning function 'OPC→INC (operating costs→income)' initiates the transfer of plan values of the operating costs into the income calculation in the BPS.

Rates/Operating Costs $$INC\_008(\text{operating costs})=-(OPC\_001(\text{EU rates})+OOC\_002(\text{EU operating costs})).$$

Heating Costs $$INC\_010(\text{heating costs})=-(OPC\_003(\text{EU heating costs})).$$

Non-Deductible Input Tax $$INC\_011(\text{non-deductible input tax.})=OPC\_008(\text{credit—non-deduct. input tax}).$$

1.1.2. TA Capping Rules (ZBPS010)

Transaction ZBPS010 makes it possible to define capping rules (TAB ZBPS024). Function module Z_BPS_003_RFC uses the capping rules for capping increases in the basic rent when calculating the plan income. Function module Z_BPS_003_RFC is initiated with the planning function download INC (income) in the source system. In order to change the capping rules, see. TA ZBPS030, where TA stands for transaction.

| field index | descriptive notes: |
|---|---|
| 1 | Table ZBPS010: capping with EUR/m² to m² |
| 2 | Table ZBPS027: capping with EUR/m² set for each type of use |

1.1.3. TA Capping with EUR/m² to m² (ZBPS011)

Transaction ZBPS011 makes it possible to parametrise the capping rule 'capping with EUR/m² to m²' specified in TA ZBPS010 with Index 1 (TAB ZBPS010).

For each rental unit, generally just one area type is dealt with—the living area or the useful area. Function module Z_BPS_003_RFC multiplies the living area, and if it is initial, the useful area with the allocated condition value to the maximum basic rent.

The area field has the unit m² and describes the top limit up to which the allocated condition value should apply.

The condition value field describes the maximum for the monthly basic rent (condition type 10) per m².

| area | condition value |
| --- | --- |
| 50,0000 | 6.75 |
| 100,0000 | 6.25 |
| 9,999,999,999 | 6.00 |

1.1.4. TA Capping with EUR/m² for Each Type of Use (ZBPS012)

Transaction ZBPS012 makes it possible to parametrise the capping rule 'capping with EUR/m² set for each type of use' specified in TA ZBPS010 with Index 2 (TAB ZBPS027).

For each rental unit generally only one area type is dealt with—the living area or the useful area. Moreover, one type of use is allocated to each rental unit. Function module Z_BPS_003_RFC multiplies the living area, and if it is initial, the useful area with the allocated condition value for the maximum basic rent.

The condition value field describes the maximum for the monthly basic rent (condition type 10) per m².

| type of use | condition value |
| --- | --- |
| 5 | 9.50 |
| 6 | 9.50 |
| 7 | 9.50 |
| 8 | 9.50 |
| 9 | 9.50 |
| 10 | 9.50 |
| 11 | 9.50 |
| 12 | 9.50 |

1.1.5. TA Rent Increase Rules (ZBPS020)

Transaction ZBPS020 makes it possible to define rent increase rules (TAB ZBPS024). Function module Z_BPS_003_RFC uses the rules to calculate the increases in the basic rent in the plan. Function module Z_BPS_003_RFC is initiated with the planning function download INC (income) in the source system.

With regard to the significance of the three rent increase rules defined here, see TA ZBPS030.

| field index | descriptive notes: |
| --- | --- |
| 1 | increase every 18 months following the last rent change by 7.5% to the basic value. |
| 2 | Table ZBPS011: rent increase in month x by y percent. |
| 3 | constant updating of the total of the condition items |

1.1.6. TA Rent Increase in Month x by y Percent (ZBPS021)

Transaction ZBPS021 makes it possible to parametrise the rent increase rule 'rent increase in month x by y percent' specified in TA ZBPS020 with Index 2 (TAB ZBPS011).

| economic unit | fin. yr period | percent |
| --- | --- | --- |
| 2004 | 3 | 5 |
| 2004 | 11 | 8 |

1.1.7. TA Rent Increase and Capping Rules/NA (ZBPS030)

Transaction ZBPS030 makes it possible to allocate a rent increase, a capping rule and the exceedance criterion to the type of use of a rental unit (TAB ZBPS026). Function module Z_BPS_003_RFC is initiated with the planning function download INC (income) in the source system. It establishes for each rental unit its annual plan income by applying the rent increase and capping and exceedance rules defined in Table ZBPS026 dependently upon its type of use.

1.1.7.1. Rule for Increasing Rent Every 18 Months

For certain rental objects, the basic rent should be increased every 18 months by a maximum of 7.5%. In the plan the extractor calculates from the month of the last actual increase an increase of the last applicable basic rent in the past period (condition type 10) every 18 months, and with immediate effect if the last actual increase was a longer period of time ago.

The extractor constantly updates the other rental portions (condition type < >10). For the case where a capping rule is active, he calculates from this the maximum basic rent and caps the increases in the basic rent upon reaching the maximum basic rent, unless the exceedance criterion is set. In this case he constantly incorporates the actual for the monthly basic rent for the whole planning horizon into the plan in so far as the actual value already exceeds the maximum basic rent.

1.1.7.2. Rule of Percentage Increase

The extractor calculates an increase in the basic rent (condition type 10) as from a specific month and by a specific percentage. The month and percentage can, but do not have to be, specified for each economic unit. The function module first of all searches in the customising table (TA ZBPS021) for an entry for the economic unit of the current rental unit, and then for an entry with the initial economic unit. The further calculation is implemented as described under '18 months rental increase rule' in the second paragraph.

1.1.7.3. Rule of Constant Updating

The extractor constantly updates the rent in all condition types. The allocation of a capping rule and the setting of the exceedance criterion do not have any effect. In order to define the rental increase rules, see TA ZBPS010. In order to define the capping rules, see TA ZBPS020.

| type of use | increase | capping | exceedance |
| --- | --- | --- | --- |
| 1 | 1 | 1 | X |
| 2 | 2 |  | X |
| 3 | 2 |  | X |
| 4 | 1 | 1 | X |
| 5 | 1 | 2 | X |
| 6 | 1 | 2 | X |
| 7 | 1 | 2 | X |
| 8 | 1 | 2 | X |
| 9 | 1 | 2 | X |
| 10 | 1 | 2 | X |
| 11 | 1 | 2 | X |
| 12 | 1 | 2 | X |

Moreover, the current portfolio can be provided using area in m² and number of units or subunits.

Some or all the data extracted can be subject of a quality inspection. As an example, the quality inspection can be a manual inspection by a user, verifying the data in the GUI. In particular, said quality inspection can be a plausibility inspection. In specific, particularly exceptional cases, manual adaptation of the data can be carried out. Particularly, manual adaptation and/or correction of the data is possible for such data, which cannot be recognized using automated statistical approaches. Such data can be changed in strategic direction of the assessment/evaluation of planned change(s) in basic data which was not yet introduced into the data and/or the automatic method. Examples of the before mentioned can comprise planned activities, such as constructional activities for the business unit and for subunits of the business unit, which have not yet been introduced or which cannot be introduced in the basic data.

Using the planned position, i.e. the future plan data, a second quality inspection can be provided. Therefore, living/housing-economic numbers are calculated. Said quality inspection provides a fast overview of a starting point for the DCF-calculation (i.e. discounted cash flow-calculation) of every individual real estate object as specific embodiments of business units or business subunits. However, extreme outliners cannot be changed at that stage. Using said calculated data, as living-economic key-data, real estate objects can be compared with each other. An example hereof is shown in FIG. 7.

Figure 8:
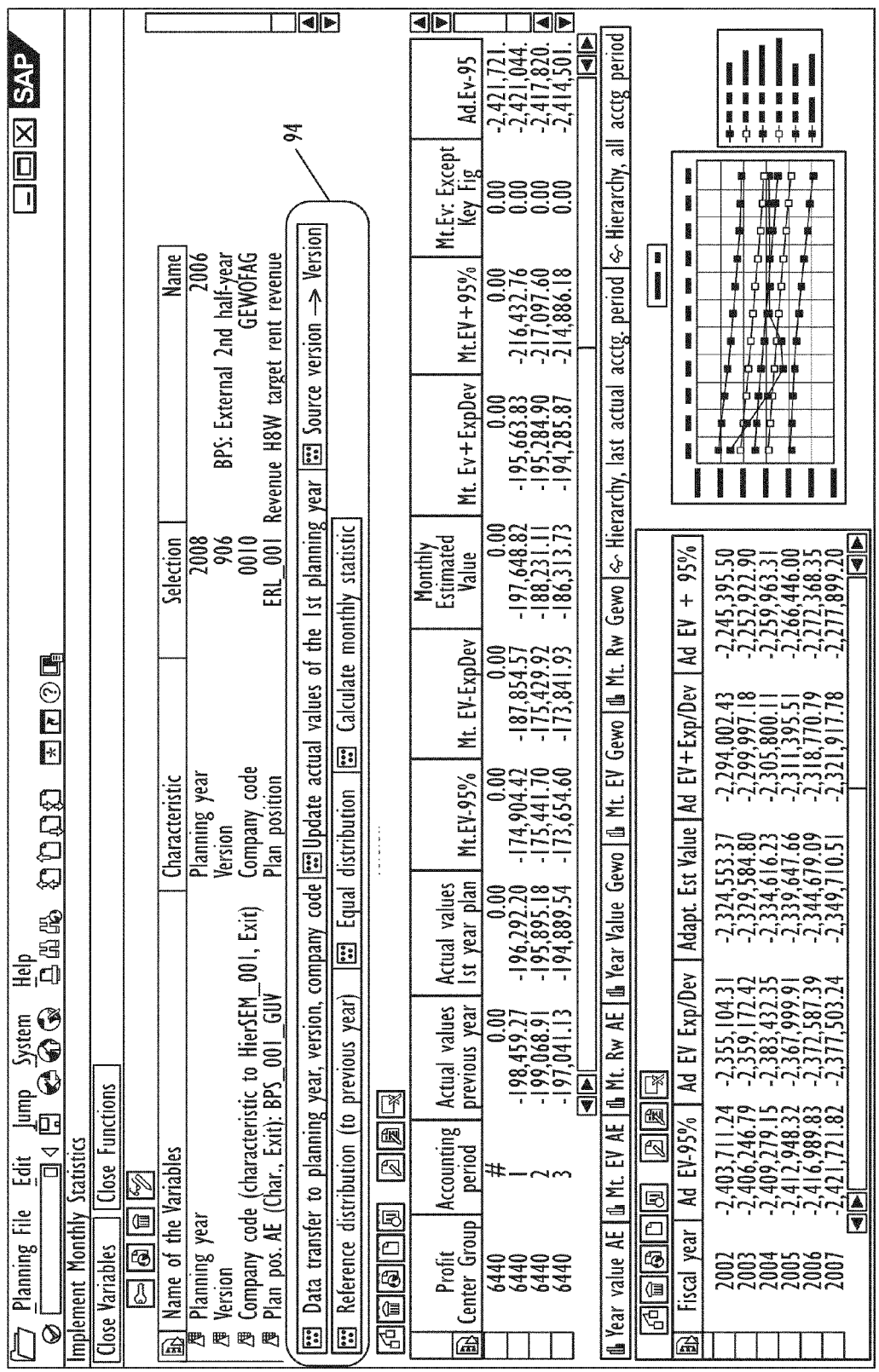
- FIG. 8: an exemplary display of data.

Referring to FIG. 2, all planned data, which can include one or more of the future plan data, the past data and the estimated values, calculated from future plan data and the past data, are taken from an annual level of the real estate object planning into the monthly statistic cube. This can be obtained by buttons 94 as shown in FIG. 8. FIG. 8 is identical to FIG. 2, wherein buttons 94 are shown in a magnified view. Hereby, a cube may be a data container, containing e.g. monthly statistic data.

The planned data on a monthly level are, according to a specific distribution, distributed on monthly basis (referred to as "reference distribution/equal distribution"). When using the reference distribution, a reference business year can be chosen. The real values of said reference business year can be used as basis for the distribution. The real values can be referred to as "current values". Particularly, real values can be the past data for the last year. Possible manual changes and/or corrections in the monthly planning can be made for the individual real estate objects. The button-up approach is applied. In other words, the data can be very granular and be further processed from said very granular form to finally provide the at least one estimate value. Particularly, in the SAP BW system, no extraction is carried out. Rather, only in the QS system, extraction is carried out. On the other hand, in the BW system, determination of the at least one estimate value is carried out and in the QS system no determination may be carried out.

Figure 9:
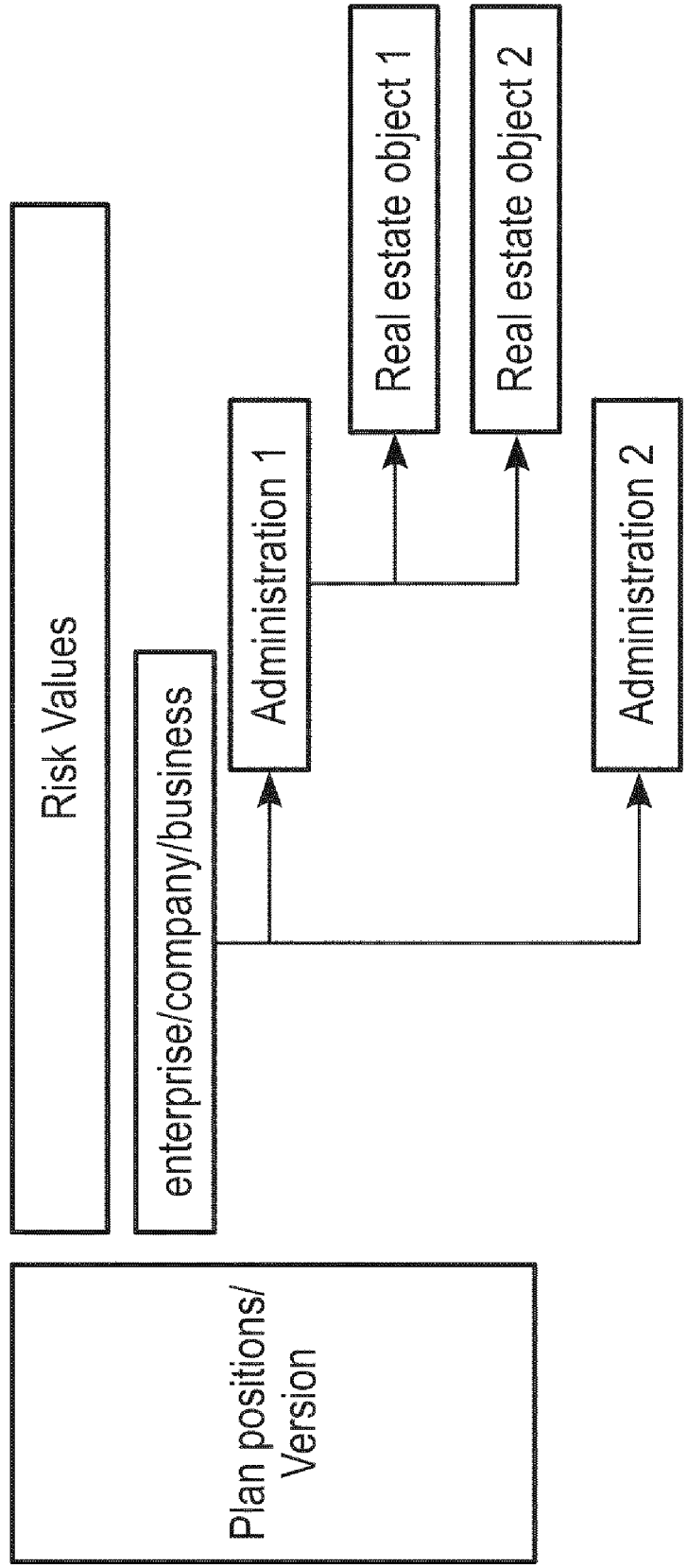
- FIG. 9: an exemplary display of data.

FIG. 9 shows a schematic overview of the reference distribution. Following that, monthly statistics can be calculated. Particularly, older risk values can be calculated per planned position, real estate object, property management units, and the business. The calculation can be made on a daily basis using updated current values.

Subsequently, the current values of the first planning year are updated. Hereby, older current values per month are taken from planning cube.

A planning version can be copied in a new version, which can be used for simulation periodical reports, etc. For further details on the simulation, reference is made to the above description.

Figure 10A:
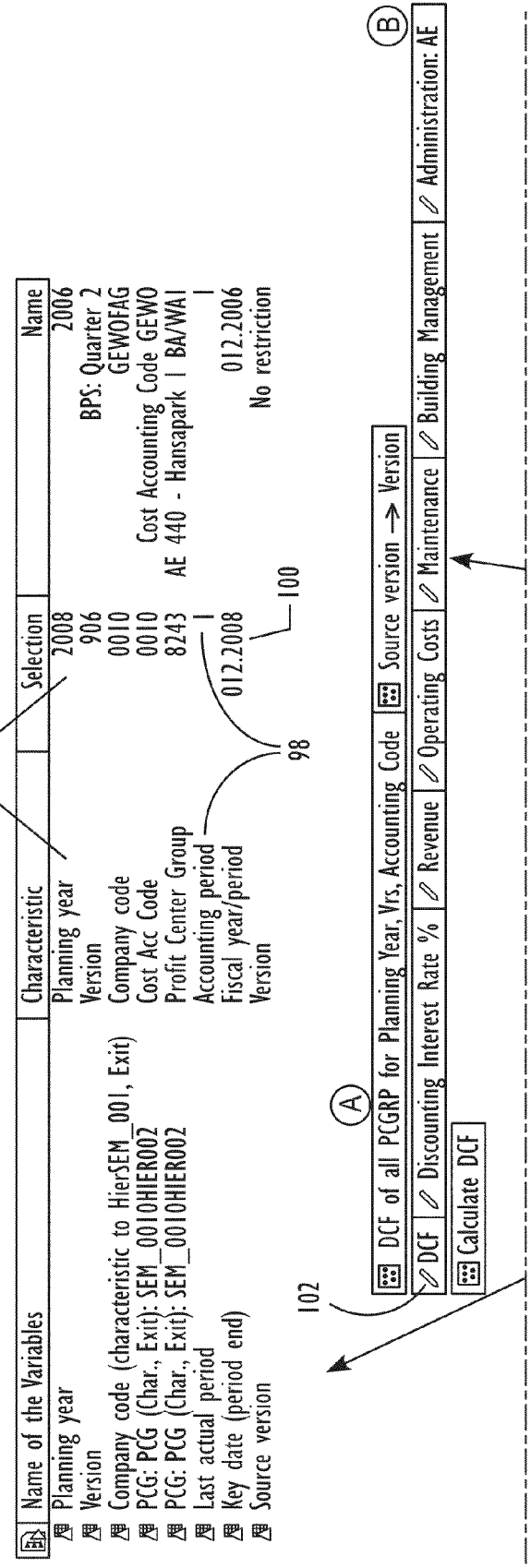
- FIG. 10: an exemplary display of data.

FIG. 10 is similar to FIG. 2. In particular, FIG. 10 comprises two magnified sections of FIG. 2. In FIG. 10, the planning year (referred to as reference numeral 96) is the year 2006. Consequently, the business year is 2007. Moreover, the current interval is chosen as 1 (referred to as reference numeral 98). The current interval 98 defines the time period for the past data and time period for the future plan data. Said values, i.e., the past data and the future plan data, represent the respective applicable annual values for a current/present period/year of business. As another example, the current interval could be chosen to 4. Therefore, the past data would be provided for 3 intervals in the past, namely, interval 1, interval 2, and interval 3. In other words, the past interval comprises intervals 1 to 3. The future plan data, according to said example, then correspond to intervals 4 to 12. In other words, the future interval comprises time intervals 5 to 12 with the time interval number 4 being the present interval. However, for the present interval (also referred to as "current interval") future plan data is extracted as well as for the future interval. Only for the past interval, past data is extracted.

Moreover, a discount rate can be chosen at reference numeral 100. As an example, said due date is used to determine the respective discount rates.

Another magnified view of a section of the display according to FIG. 2 is shown in FIG. 10. The following steps can be carried out:

1. After determining selection criteria (as exemplary described with reference to FIG. 10) for a novel calculation the method according to the application is applied for all real estate objects (also referred to as "profit centre groups").
2. Thereby, for the planning positions (referred to as "Revenues-Administration"; German language: "Erlöse-Verwaltung") a cash flow in view of risk points are determined and discounted with the chosen discount rates.
3. The discounted cash flow was calculated/determined for all real estate objects. Hence, the discounted cash flow can be evaluated for all real estate objects as well.

Steps 1 to 3 can be carried out by selecting and/or activating one or more buttons as shown in a magnified section of the GUI (referred to as reference "A").

Moreover, for a manual interference, the cash flow for an individual real estate object can be changed/corrected in field 104, which is referred to as the field "correction" (German language: "Korrektur"). The cash flow can be corrected for every planned year. For an individual calculation/determination of the discounted cash flow (as the preferred estimate value) in the selection image according to FIG. 10, it is possible to navigate over the last row/line. The above described method steps are related to "B" in FIG. 10.

FIG. 11 shows a screen shot of an analysis of limit factors/limit factors.

FIG. 12 shows a ranking list according to the discounted cash flow values of business units, wherein individual business units are shown in lines 16 to 22 (line-numbers are indicated in the left column of the screen shot according to FIG. 10). Moreover, subunits of the business units, which can be real estate objects, are shown in lines 23 to 39. Further subunits can follow, but are not shown in the screen shot. Moreover, for each business unit and/or subunit discounted cash flow-values are shown according to the constant approach (column 106), the linear approach (column 108), and the non-linear approach (column 110). Following that, an easy overview can be obtained, which business unit and/or subunit has a specific discounted cash flow value according to the different approaches. Moreover, a very easy variation and/or comparison between the different business units and/or subunits is possible.

Figure 13A:
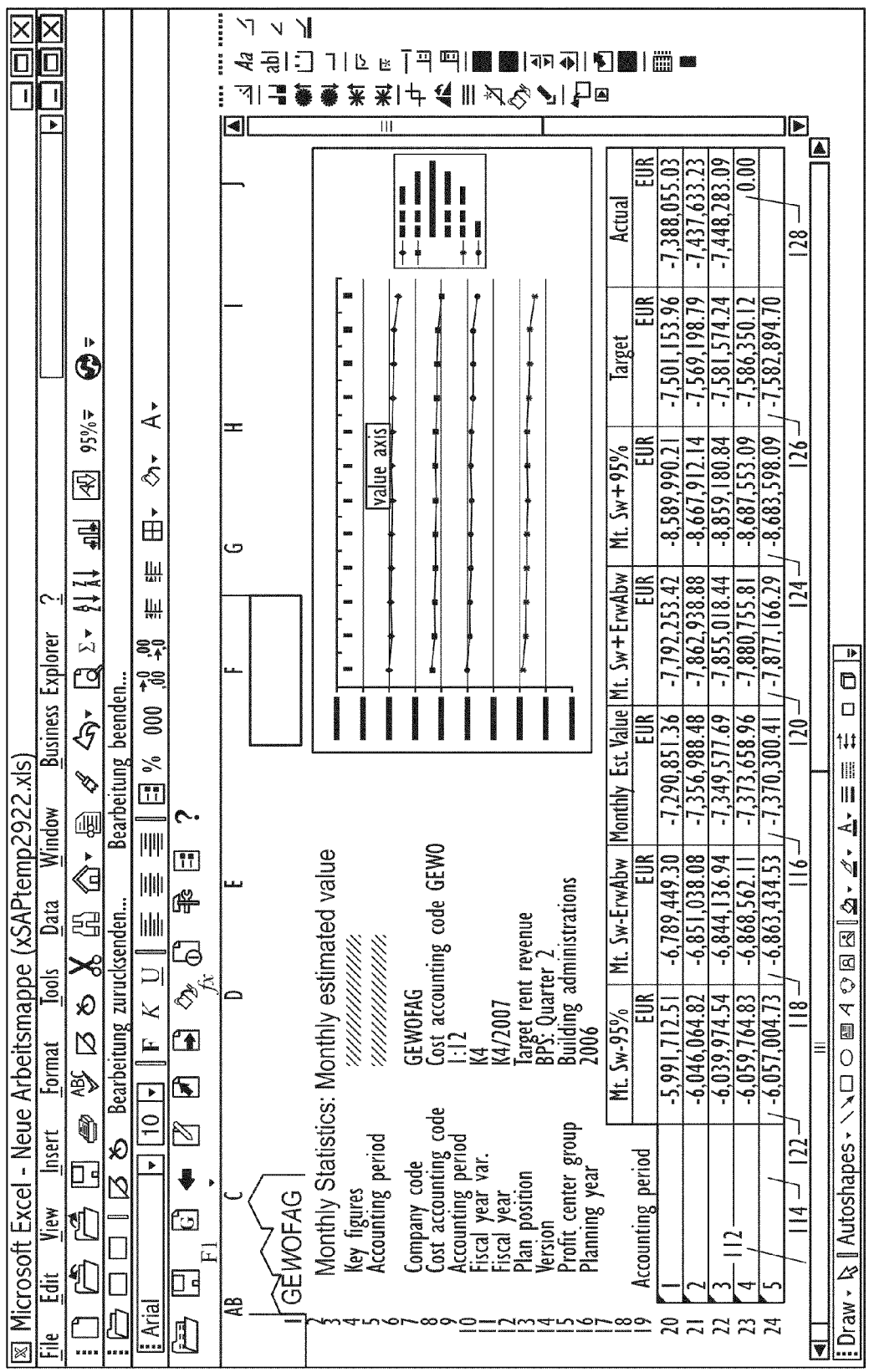
- FIG. 13: an exemplary display of data.
Figure 13B:
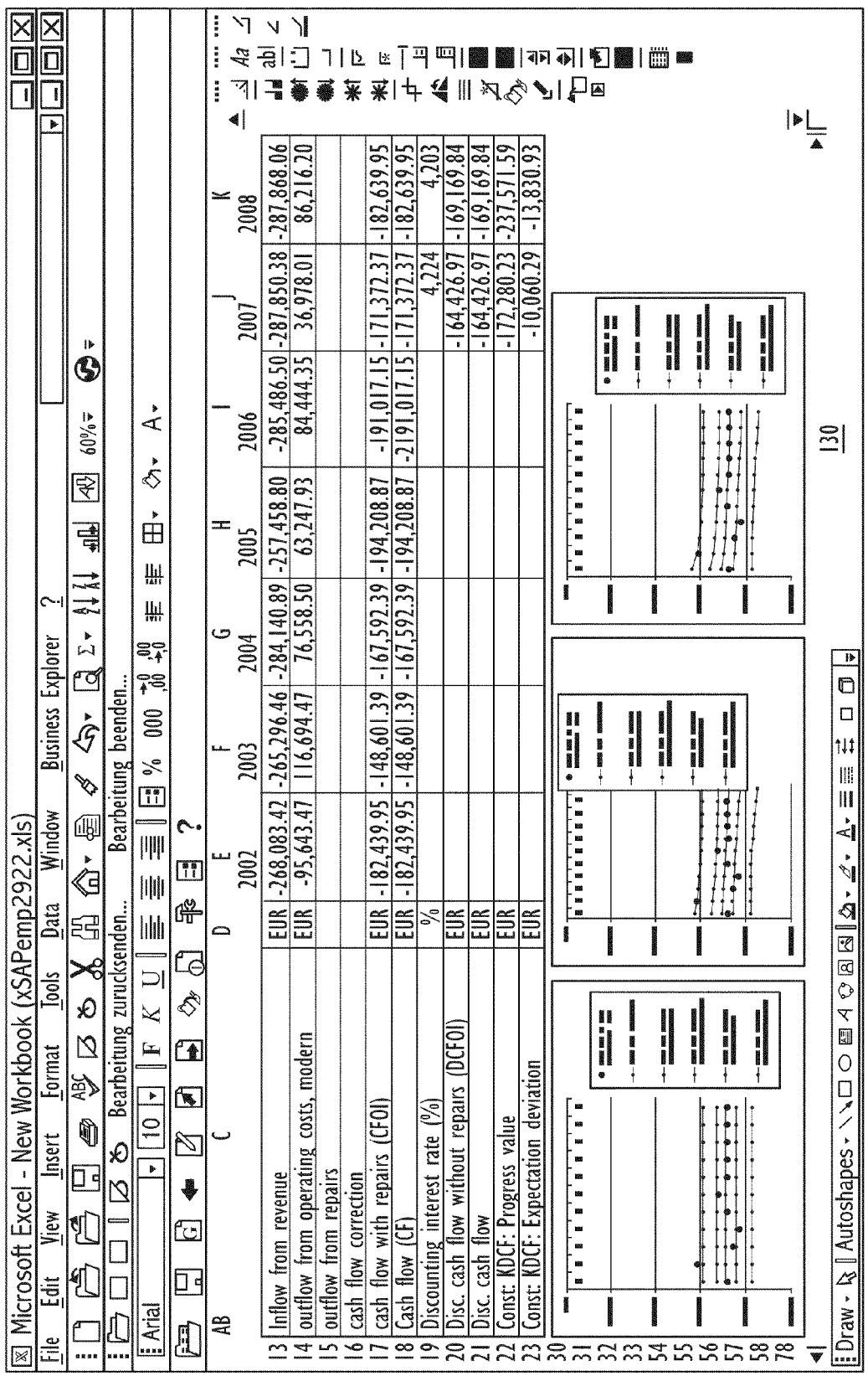

FIG. 13 shows two screen shots of graphical user interfaces, wherein a possible variation is shown in screen shot 112. In particular, booking periods 1 to 12 shown in column 114 of screen shot 112. These booking periods can correspond to years particularly in the future of the present year. There are shown the discounted cash flow values in column 116 (as preferred estimate values). In column 118 and 120 estimate values are shown. In columns 122, 124 values representing the 95% confidence interval are shown. In column 126 the gained values are shown, and in column 128 the current real values are shown. In other words, the present period is period 5, and the values of 128 referring to periods 1 to 4 are past data.

Reference numeral 130 represents a graphical user interface similar to that of FIG. 4.

Summarizing, as can be seen e.g. from FIGS. 5 and 6, which show that large number of data is provided for a business unit, said large number of data can be used and an estimate value can be determined, as shown in FIG. 12. The estimate values (constant discounted cash flow-value, linear discounted cash flow-value, and non-linear discounted cash flow-value) can be easily compared with a number of business units, such as real estate objects and sub-objects, etc. Such an easy comparison is not possible from the data, e.g. shown in FIG. 5 and FIG. 6. Moreover, as shown in screenshot/GUI 130 of FIG. 13, estimate values can be easily visualized as graphs. Reference is also made to FIG. 4. In graphs 84, 86, and 88, there are shown discounted cash flow values according to the constant approach, the linear approach, and the non-linear approach.

Moreover, the above description is a mere example only. A combination of one or more individual features and/or method steps of the individual embodiments and/or variants is possible. Therefore, it is possible to provide further embodiments and/or variance of computer systems and/or methods, which are not described above.

Figure 14:
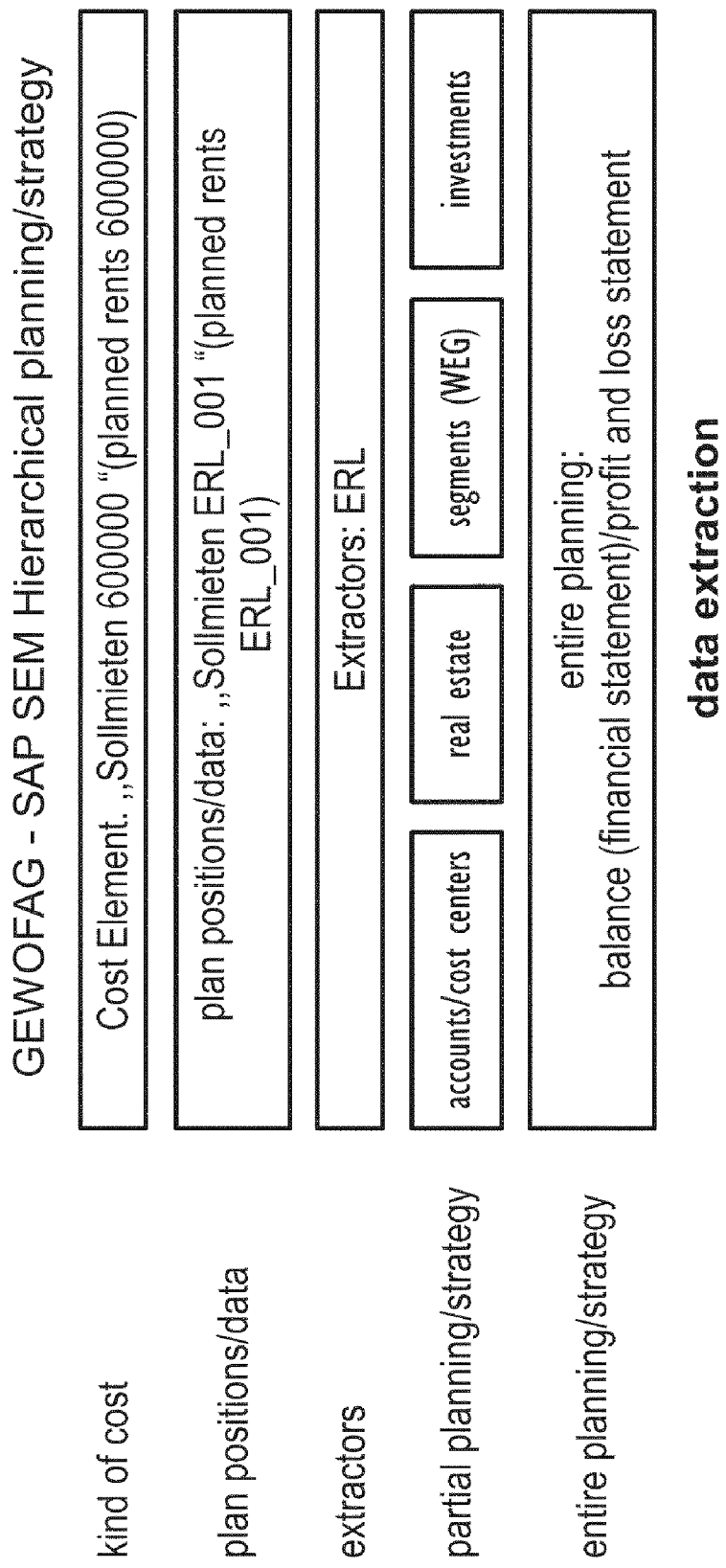
- FIG. 14: a schematic overview of components the computerized method.
Figure 16:
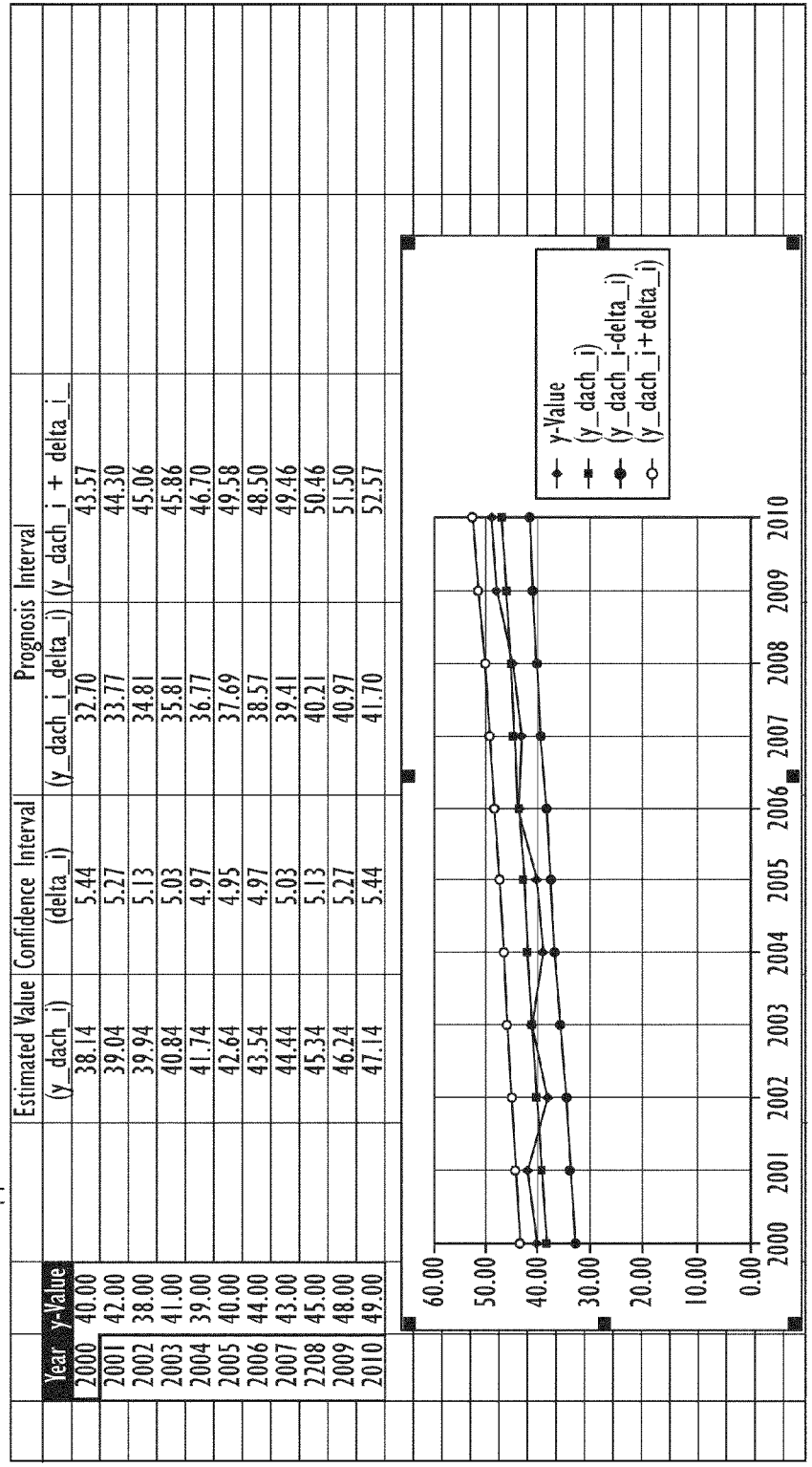
- FIG. 16: an exemplary display of data.
Figure 17:
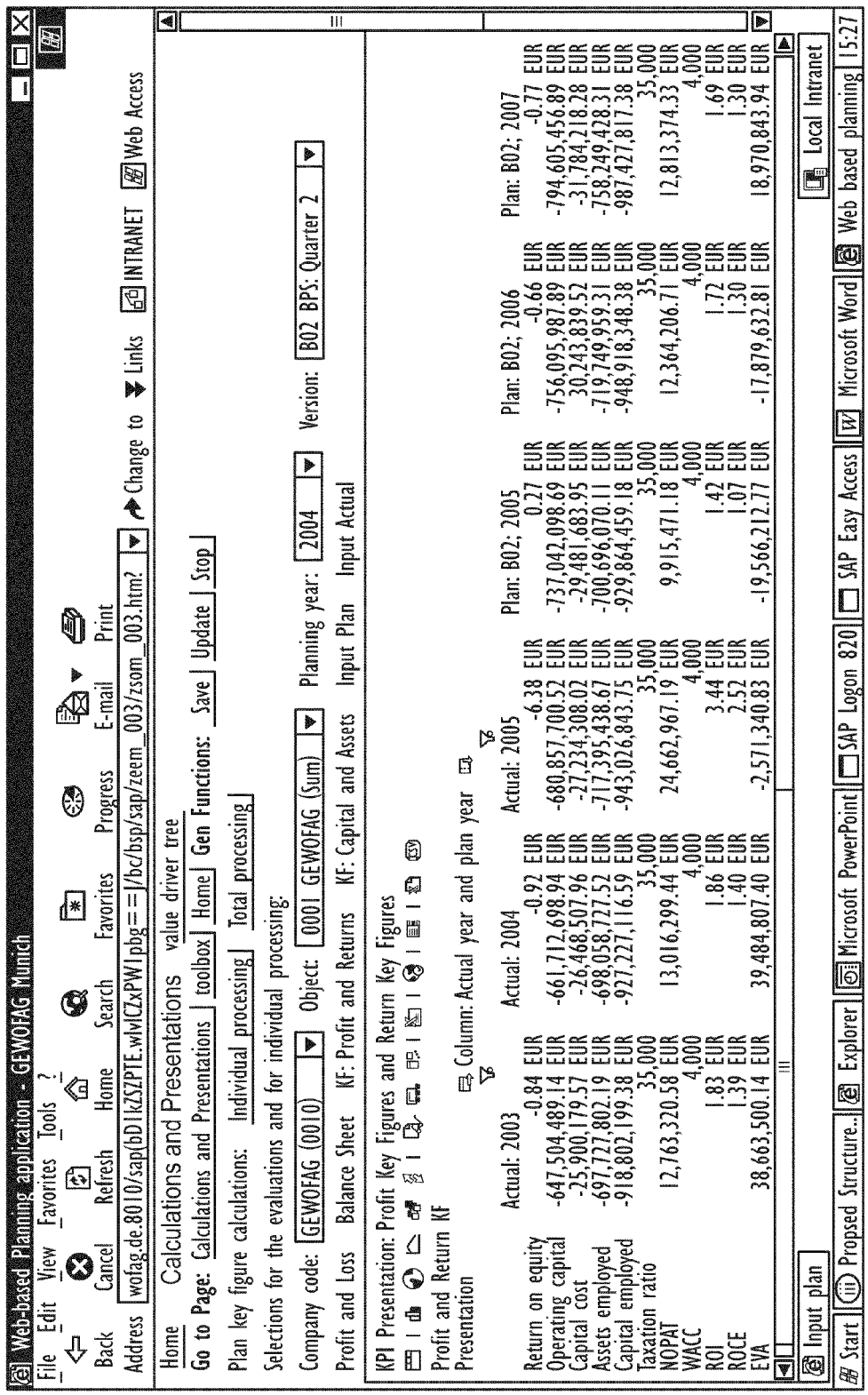
- FIG. 17: an exemplary display of data.
Figure 19:
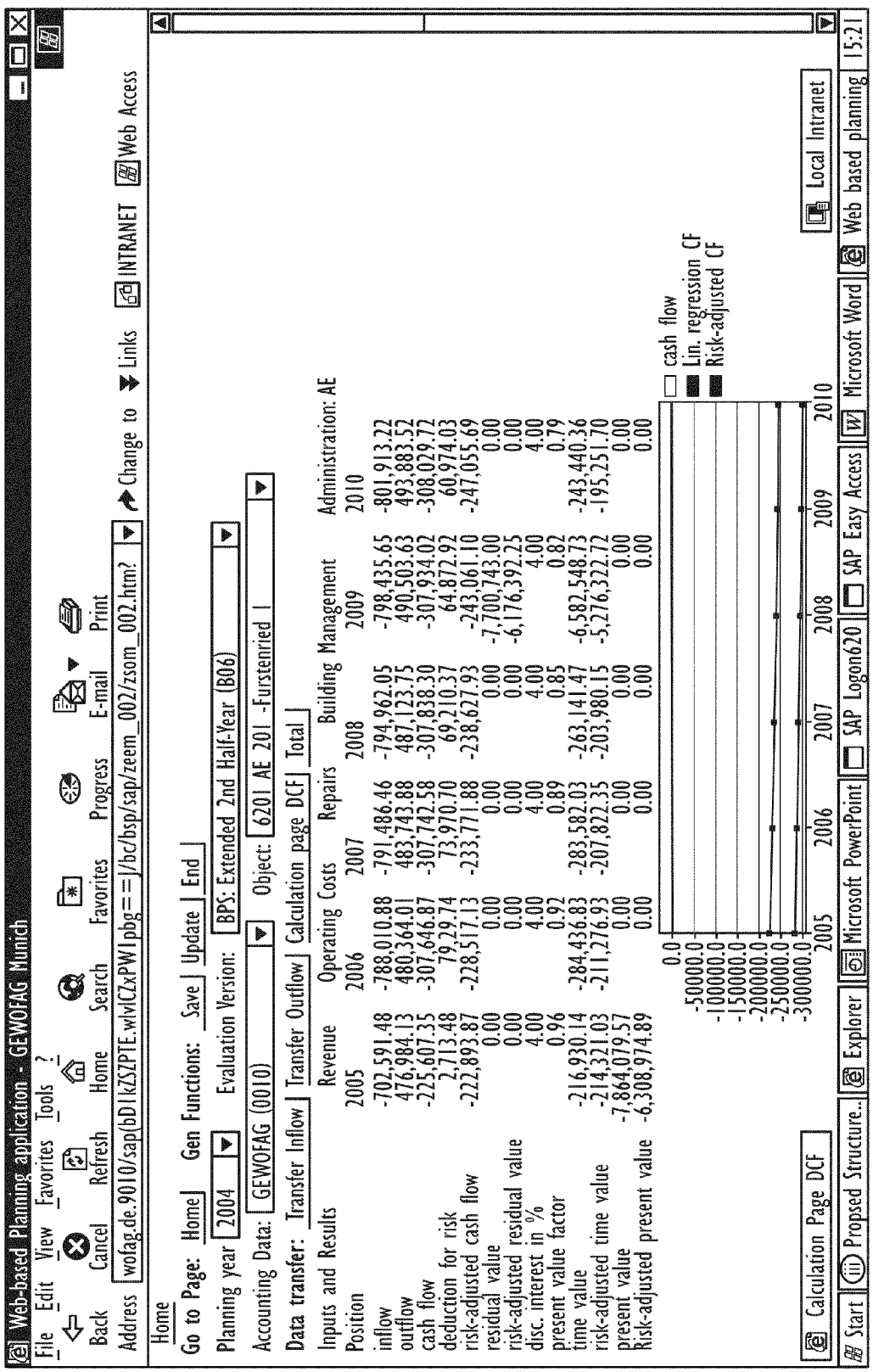
- FIG. 19: an exemplary display of data.
Figure 22:
- FIG. 22: an exemplary display of data.
Figure 23:
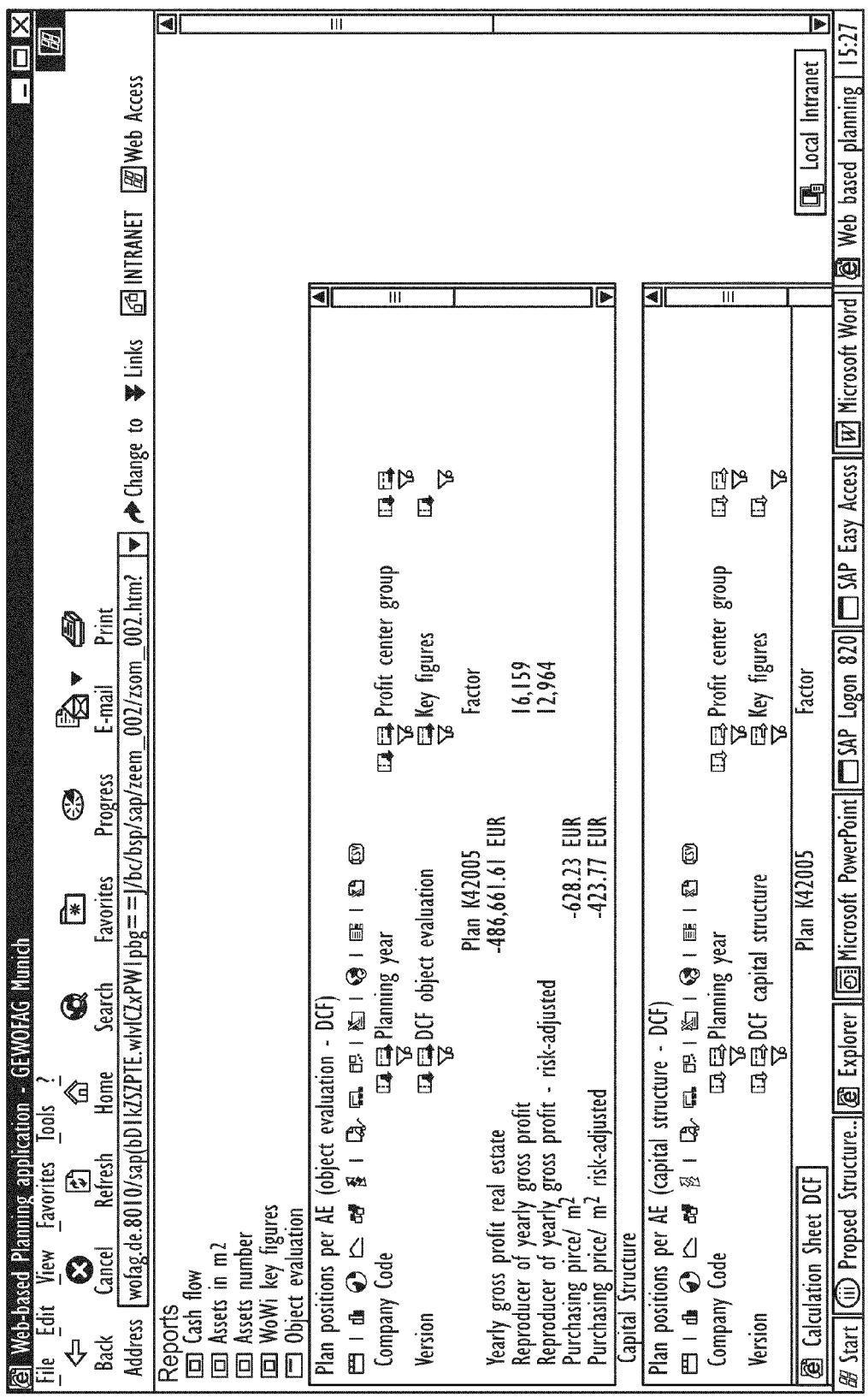
- FIG. 23: an exemplary display of data.

FIG. 14 comprises a schematic overview of components of and/or data used by one or more embodiments of the computerized method.

Figure 18:
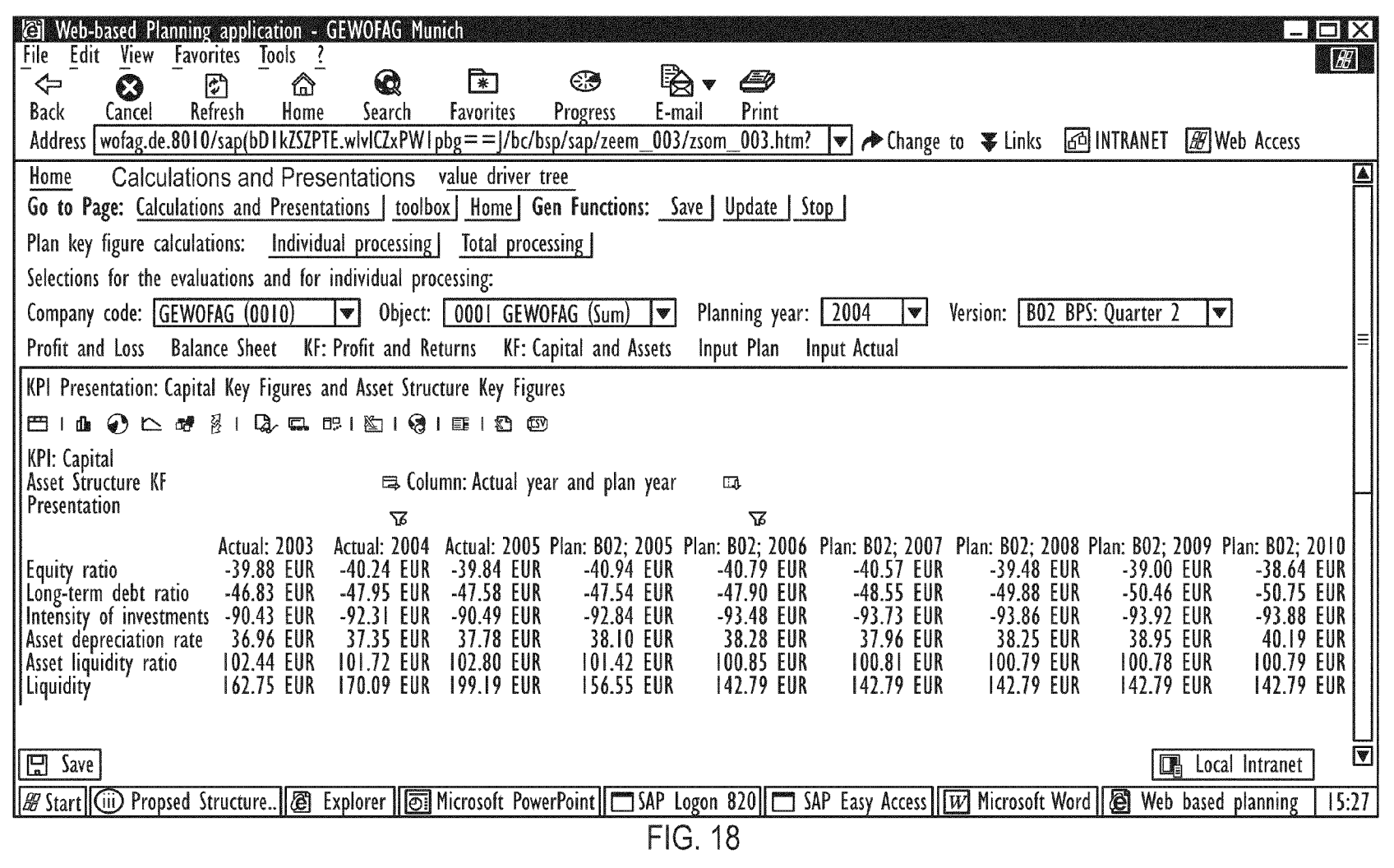

FIGS. 15 to 23 comprise an exemplary display of data used for and/or by and/or created by one or more embodiments of the computerized method.

Figure 24:
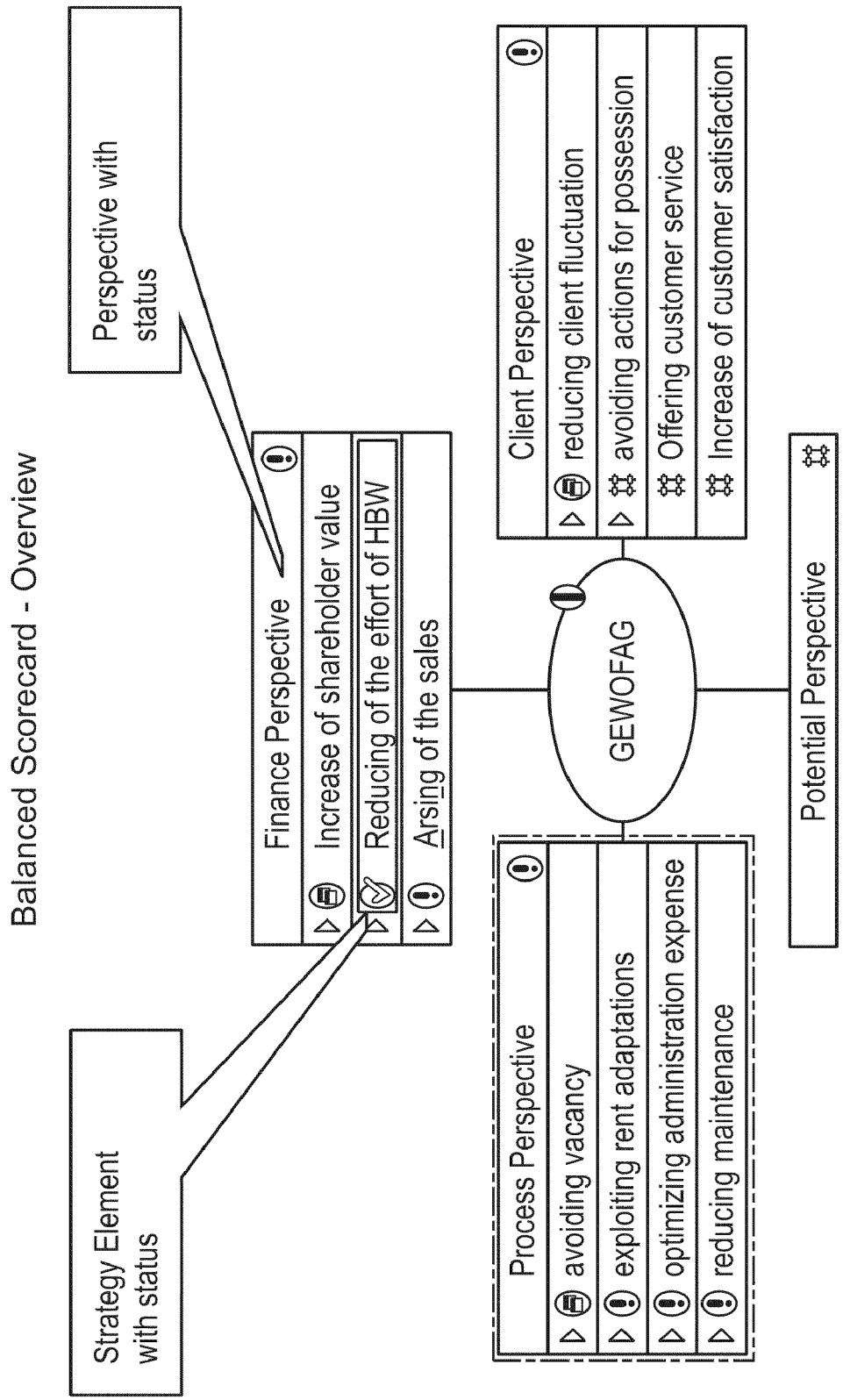
- FIG. 24: an exemplary display of an evaluation.
Figure 25:
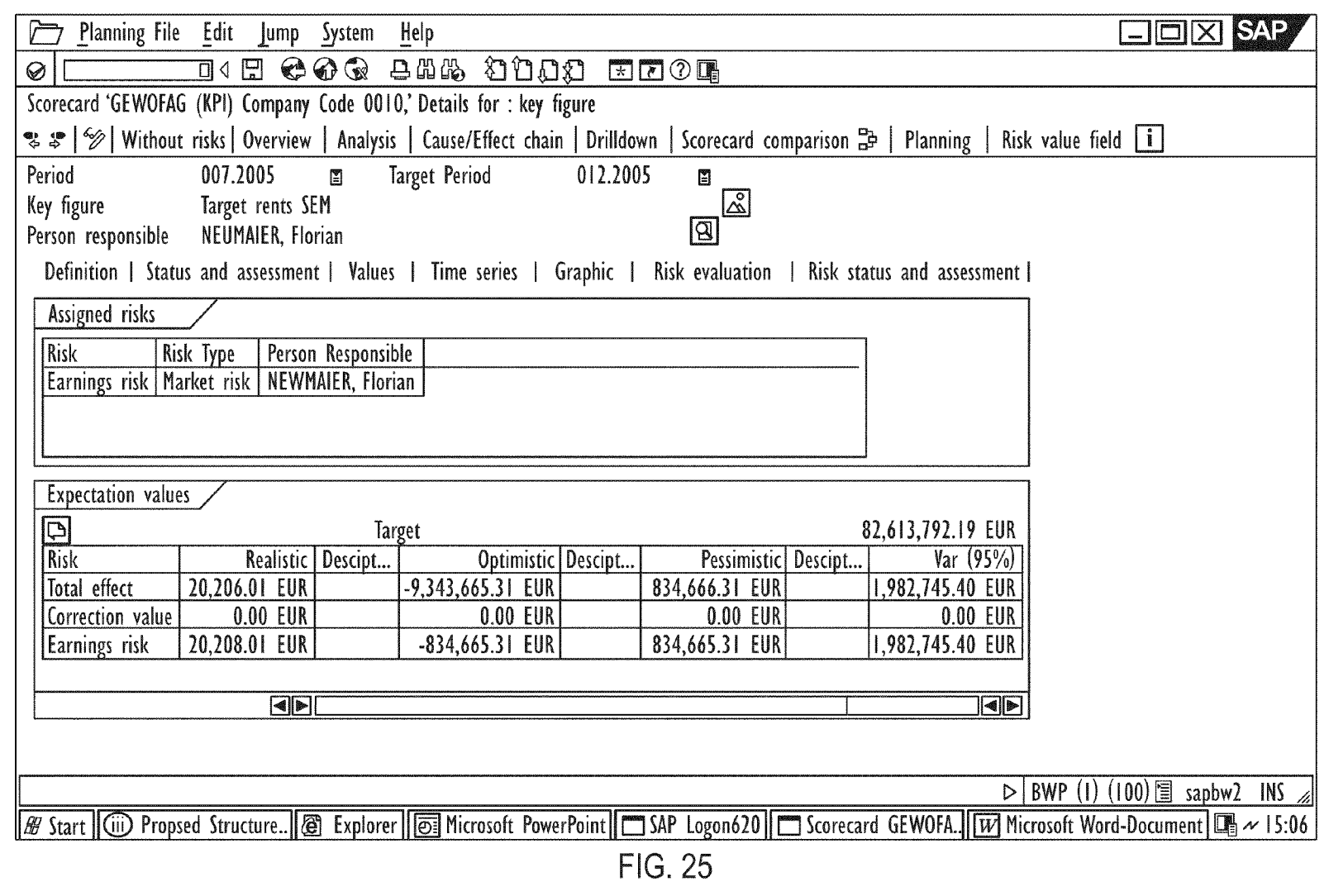
Figure 26:
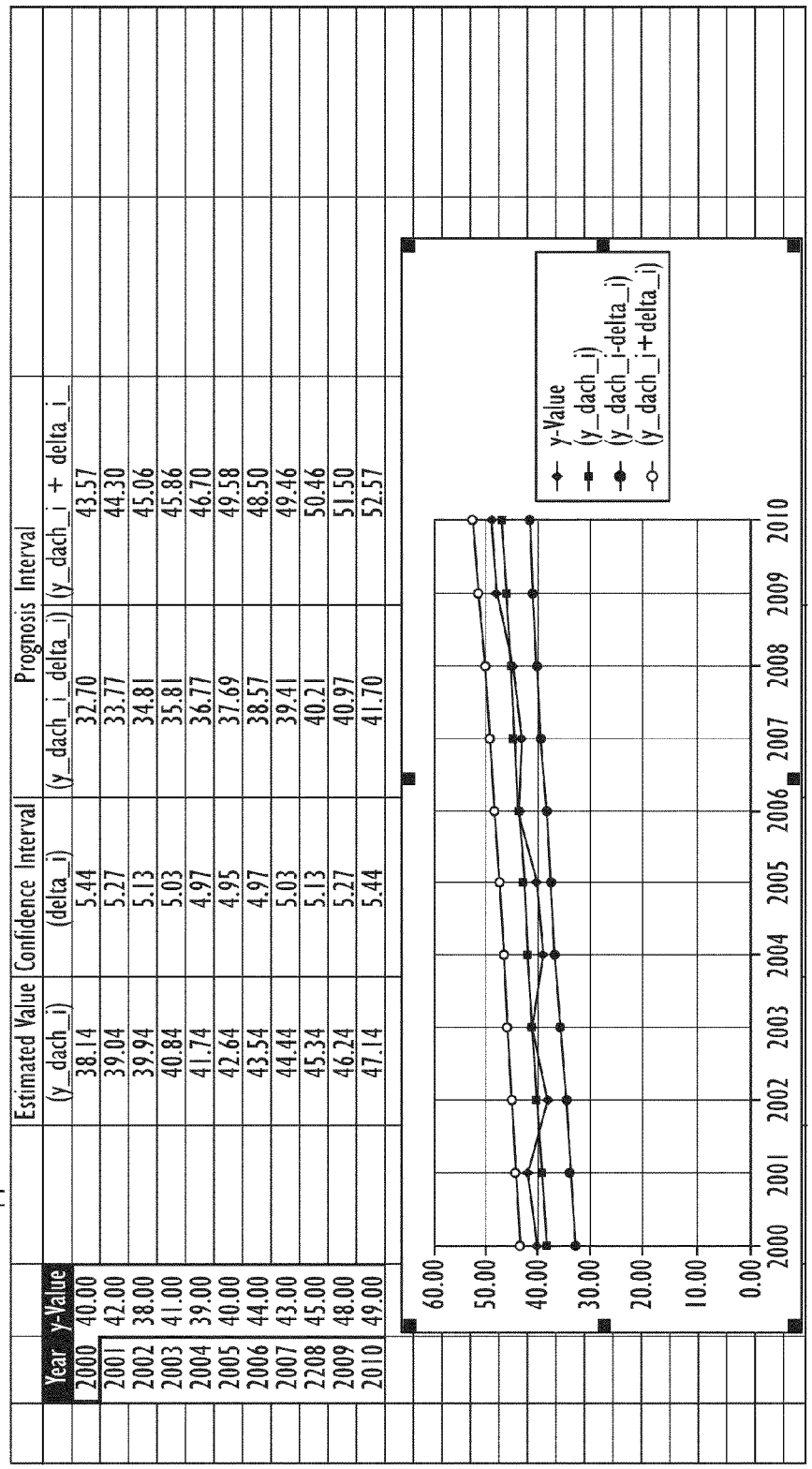
- FIG. 26: an exemplary display of an evaluation.

FIGS. 24 to 26 comprise an exemplary display of an evaluation carried out and/or displayed and/or possible by one or more embodiments of the computerized method.

Figure 27:
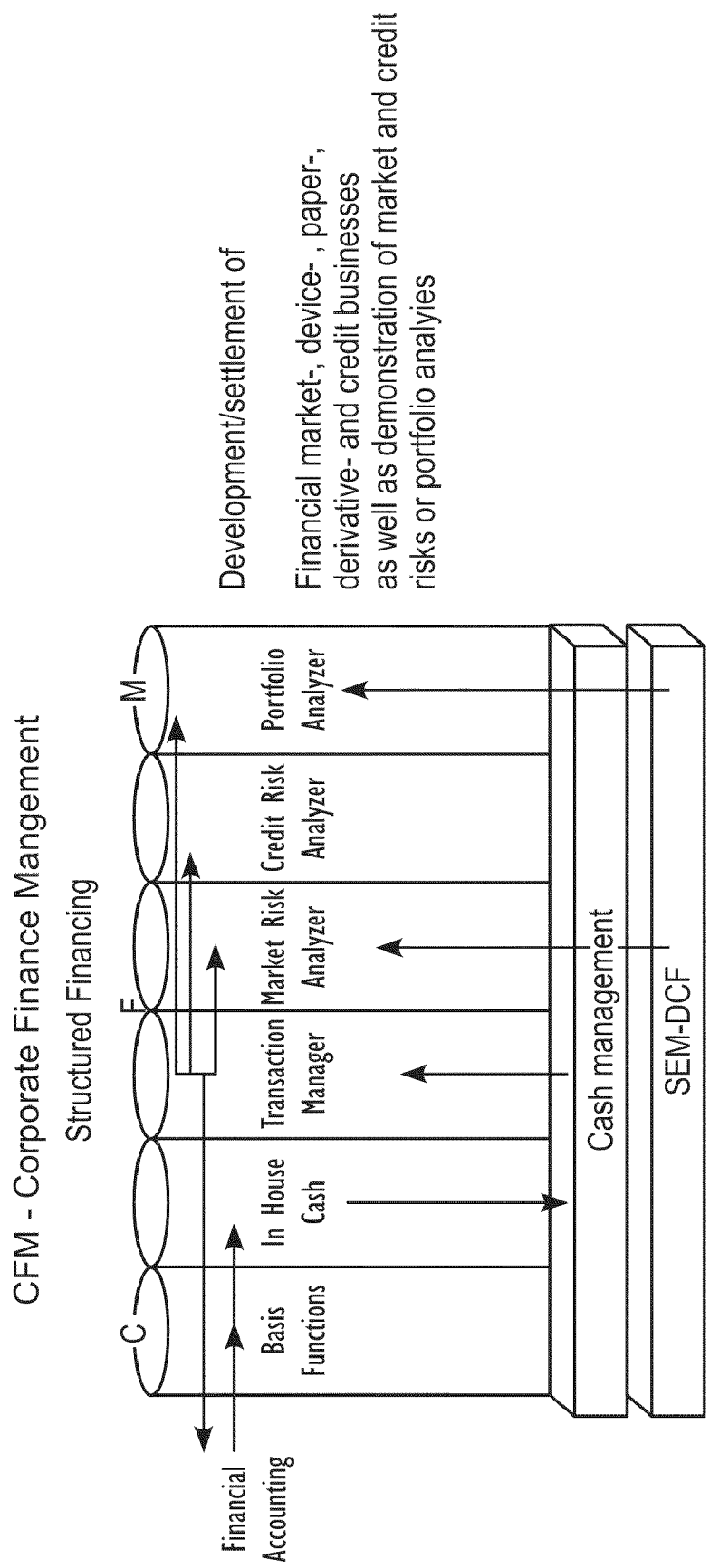
- FIG. 27: a schematic overview of components the computerized method.
Figure 28:
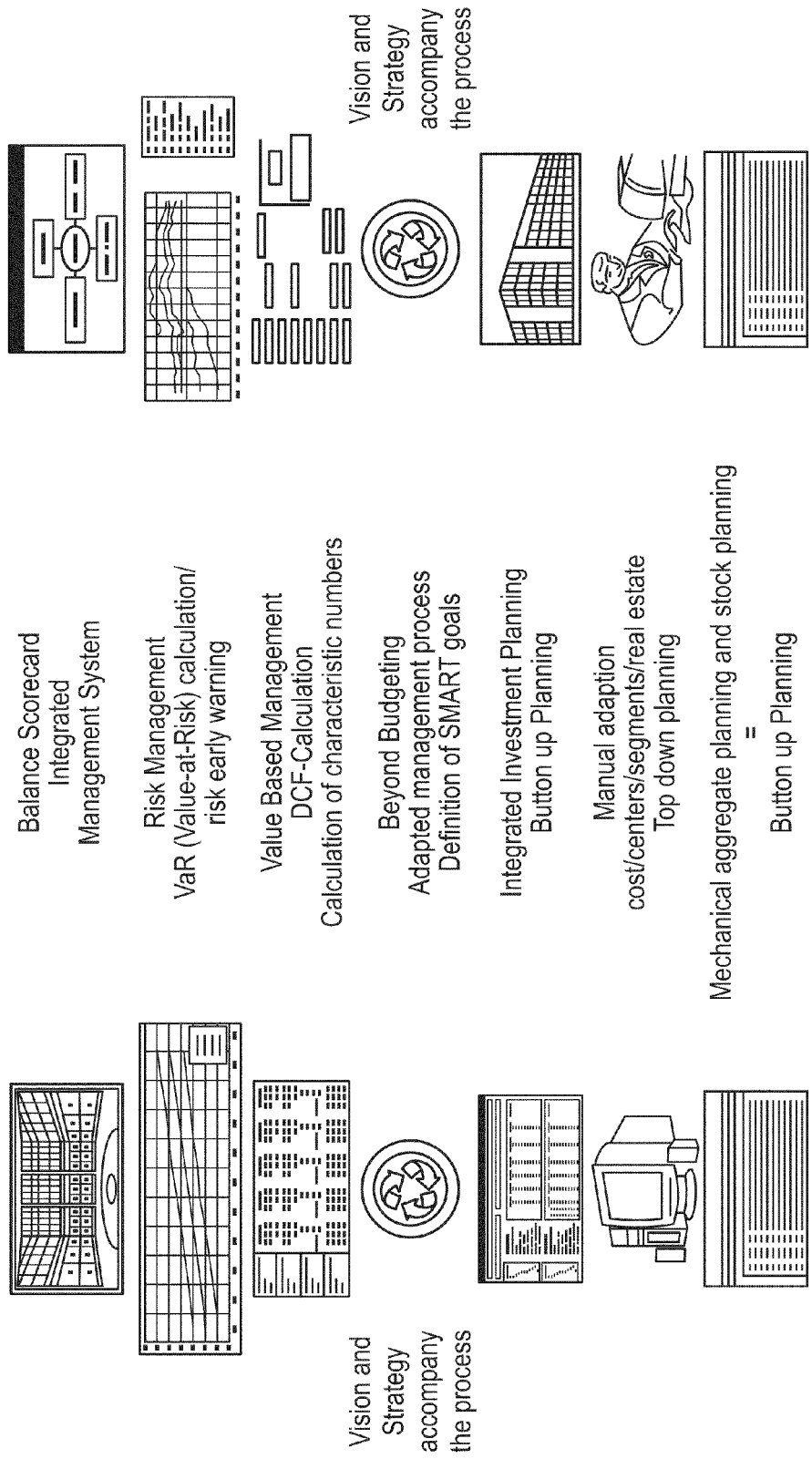
- FIG. 28: a schematic overview of components the computerized method.
Figure 29:
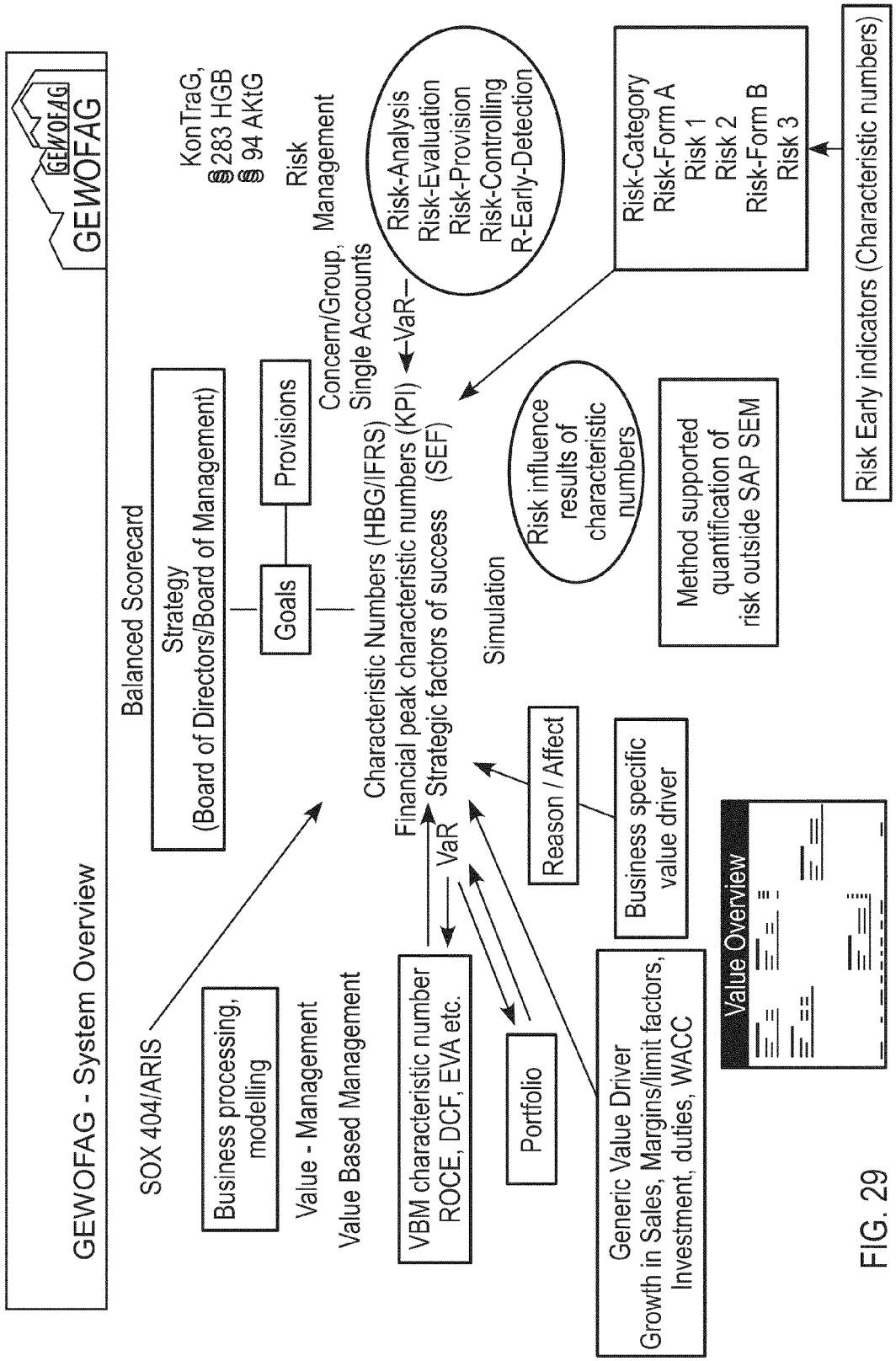
- FIG. 29: a schematic overview of components the computerized method.

FIGS. 27 to 29 each comprises a schematic overview of components of and/or data used by one or more embodiments of the computerized method.

An exemplary embodiment of the method can be summarized as follows:

A statistical DCF approach for asset valuation can be realized within SAP Business Information Warehouse (SAP BW). 'Relevant business information from productive SAP applications and all external data sources can be integrated, transformed, and consolidated in SAP BW with the toolset provided.' Within SAP BW system the BW-BPS (business planning and simulation) application provides a framework to develop customer specific planning application like our DCF application.

Calculation

The calculation of the DCF is done in two steps. First data are extracted from the source system. Then statistics are performed on the extracted data.

Database

From the profit and loss account (P&L) of the SAP enterprise resource planning system (source system) actual values for 5 years in the past and plan values for 6 years in the future are extracted on an annual basis into the SAP BW system. Planning is mainly performed on two characteristics, on planning positions and on profit center groups:

A plan position describes a set of accounts, which for planning purposes can be logically grouped together. For example several accounts of ordinary depreciation form one plan position, while accounts of rental revenues form another one.

A profit center group forms a set of profit centers. In profit center accounting a profit center 'reflects a management-oriented structure of the organization for the purpose of internal control'. In our application profit center groups represent a business entity. A business entity groups coherent real estate objects.

Within the DCF application five categories of plan positions define which values add up to the cash flow. Category 'Revenues' identifies the incoming payments. The categories 'Operating costs', 'Maintenance', 'Building operation' and 'Building administration' terms the payouts. The sum of incoming payments and payouts constitute the cash flow.

Mathematics

The mathematics of regression analysis on which we base our DCF approach can be found in Sen and M. Srivastava, Regression analysis: Theory, methods and applications. Springer, New York, 1990)

G. A. F. Seber, C. J. Wild, Nonlinear Regression. Wiley, New York, 1989, which disclosure is explicitly incorporated by reference. In particular, the specific following mathematical terms can have a meaning, as conventionally assumed and applied in the field of statistics, statistical methods, statistical mathematics, etc.

To discount the cash flows, market traded annual interest rates it are taken into account for all available periods, i.e. typically for a range of fifty years. The years beyond are calculated with the last available interest rate.

To approximate the discounted cash flow DCF of a business unit, we perform regression analysis on its past and/or future time indexed periodical cash flows $y_t$; t=1, ... n using three different models:

$$DCF_c = \sum_{t=1}^{\infty} \frac{f_c(t_0 + t)}{(1 + i_{t_0+t})^t}; \quad f_c(t) := \hat{\beta}_0 \text{ (constant model)}$$

$$DCF_l = \sum_{t=1}^{\infty} \frac{f_l(t_0 + t)}{(1 + i_{t_0+t})^t}; \quad f_l(t) := \hat{\beta}_0 + \hat{\beta}_1 t \text{ (linear model)}$$

$$DCF_n = \sum_{t=1}^{\infty} \frac{f_n(t_0 + t)}{(1 + i_{t_0+t})^t}; \quad f_n(t) := \hat{\beta}_0 + \hat{\beta}_1 t^{\hat{\beta}_2} \text{ (nonlinear model)}.$$

Therein $i_t$ represents a market traded interest at time index t and $t_0$; $0 \leq t_0 \leq n$ represents the index of the last actual data; i.e. $t_0+1$ represents the index of the first plan data. Typically, one would prefer to restrict the estimation of the parameters $\hat{\beta}_0$, $\hat{\beta}_1$ and $\hat{\beta}_2$ to a sample of past or actual data, i.e. choose $t_0:=n$. To stabilize the estimation, if only small samples of actual data are available, however future or plan data can be incorporated into the data base. We allow this in our application, since all important future values are planned on the most granular level of the objects of the source system application. For example rental revenues are planned on the basis of the individual conditions of each rental contract.

To calculate the parameters $\hat{\beta}_0$, $\hat{\beta}_1$ and $\hat{\beta}_2$ we assume, as within the classical regression approach, a normal distribution with expectation 0 and variance $\sigma^2$ for all random error variables $\beta_t$; t=1, ... n, i.e. $\epsilon_t \sim N(0; \sigma^2)$; t=1, ... n.

Now in the constant model $\hat{\beta}_0$ is calculated as the statistical estimator for parameter $\hat{\beta}_0$ in the constant, time independent model $y_t = \beta_0 + \epsilon_t$; t=1, ... n.

the linear model $\hat{\beta}_0$ and $\hat{\beta}_1$ are calculated as the statistical estimators for parameters $\beta_0$ and $\beta_1$, respectively, in the linear, time dependent model $y_t = \beta_0 + \beta_1 t + \epsilon_t$; t=1, ... n.

the nonlinear model $\hat{\beta}_0$, $\hat{\beta}_1$ and $\hat{\beta}_2$ are calculated as the statistical estimators for parameters $\beta_0$, $\beta_1$ and $\beta_2$, respectively, in the nonlinear time dependent model $y_t = \beta_0 + \beta_1 t^{\beta_2} + \epsilon_t$; t=1, ... n.

$f_c(t)$, $f_l(t)$ and $f_n(t)$ are special occurences of function class f(B,t), where B constitutes the parameter vector to be estimated. Other special occurences of function class f(B,t) can be added to approximate the DCF value, if appropriate.

$f_c(t)$ was chosen, because it reflects the conventional approach, where over a fixed period a variable cash flow is estimated and over the rest of time a cash flow, typically the last one, is assumed to be constant.

$f_l(t)$ was chosen, because it additionally allows to model constant growth, incorporates the classical linear regression model and allows—using only two parameters $\beta_0$ and $\beta_1$—fairly stable estimations.

$f_n(t)$ was chosen, because it incorporates functions with monotone curvature and thus allows to model dynamic growth. On the other hand, incorporating one more parameter than $f_l(t)$, this class is more susceptible to outliers in the database.

In other words, e.g. the estimators can be calculated using standard methods, such as minimizing least square values, etc.

The calculation is performed for several models in parallel, because the choice of the model results not always straightforward from the database. This problem can be tackled by taking more years of historical data, i.e. past data, into account. In practice however, databases are usually fairly small.

The advantages of the statistical approach over the classical approach (as for example described in Ballwieser, 'Unternehmensbewertung, Prozeß, Methoden und Probleme', Schäffer/Poeschel, 2004) are that within the standard assumptions of the specific regression model m an unbiased estimator not only for $DCF_m$, but also for the variance of the random error variables and thus for the variance of $DCF_m$, $\sigma^2(DCF_m)$, can be calculated. This allows to approximate the distribution of $DCF_m$ and thus to evaluate the precision of its estimation and to model risk premiums objectively, whereas in the field of estimating economic values (subjective) expert knowledge is susceptible to biases, see e.g. the above reference(s).

The need, but not the possibility of this aspect is seen in the classical DCF approach. Ballwieser, for example, states: "Theoretically for future earnings probability distributions have to be forecasted. The probabilities can only be interpreted as subjective plausibilities or degrees of accepting an outcome as true. Probabilities derived from logical considerations or from the analysis of relative frequencies are not to be attained for the purposes of the valuation of a company", see Ballwieser, Unternehmensbewertung, Prozeß, Methoden und Probleme', Schäffer/Poeschel, 2004, page 49f.

To model a risk adjusted DCF $DCF_m^r$, we calculate a risk premium $RP_m$ for $DCF_m$ and set $$DCF_m^r := DCF_m - RP_m,$$

because a risk premium defines "the difference between the expected value of an uncertain bet that a person is willing to take and the certain value that he is indifferent to" (reference is made to www.wikipedia.org). Since the distribution class is given within regression model m, the uncertainty of the 'bet' $DCF_m$ only depends on its standard deviation $\sigma_m := \sigma(DCF_m)$.

If, sufficient for practical reasons, we assume the risk premium to be independent from the expectation of $DCF_m$, the risk premium $RP_m$ can be modeled using the unbiased estimator $\hat{\sigma}_m$ of $\sigma_m$, i.e.

$$RP_m := \hat{\sigma}_m c,$$

wherein constant c expresses the degree of risk aversion.

To simplify the approach for the user, he is offered to set the risk premium (i.e. to express c) by naming a confidence level, i.e. a probability for the risk of the deviation from the expectation of $DCF_m$, or by choosing the expectation of the deviation from the expectation of $DCF_m$, i.e. by choosing $E(|DCF_m - E(DCF_m)|)$.

Advantageously c can be given in advance of the calculation of $DCF_m$, so that the user can easily simulate the outcome $DCF_m^r$ for different degrees of risk aversion.

In advantage over the classical DCF approach, risk premiums are modeled by using only one parameter, not by using utility functions, which are hard to judge and to express.

For the purpose of comparing the performance of different business units, we scale $DCF_m^r$ by the first estimated plan value $f_m(t_0+1)$ and define the model dependent limit factor $$l_m := \frac{DCF_m^r}{f_m(t_0 + 1)}.$$

This key figure allows to compare the future cash flow developments of the different business entities on a relative basis. By sorting the limit factors of a big number of business entities, f.i. in a periodical report, the controlling department of a real estate company can easily identify good and undesirable developments. Making comparable different business units, the limit factor concept promotes competition within a company and thus supports the beyond budgeting approach.

Features and Benefits

Polyvalence Principle

Polyvalence principle with the components principle of reference to the future and principle of risk and chance. "A company evaluator, who, instead of exploring the diversity of future possible operating revenues, confines himself to a single value forecast, takes his task too easy. He immunizes his result; only a fortuneteller can contradict a fortuneteller." [Moxter, cited in Ballwieser, S.56]

Reactivity to Changing Environmental Conditions

All changes reflected in the underlying ERP system are automatically propagated into the results.

The following advantages and features can be provided by the above described method and/or the following features can be incorporated in the above described method.

Extraction of the actual and planned data on annual level for a horizon of 5 years in the past and a planning (future) horizon of 6 years per planning position and profit-center-group (economic entity)

Individual planning maps for the partial planning of the cost centers, economic entities, profit-centers and investments Bottom-up-Planning: up-roll of the partial plannings onto the group/concern to a total planning Period distribution of the planning values of the profit and loss account Period related Value-at-Risk-Calculations (VaR calculations) inclusive expectation deviations and 95%-confidence-interval (so-called monthly statistic) with novel characteristic value as a component of a risk early-warning system Novel DCF-calculation for enterprise controlling for the purposes of a Beyond-Budgeting-Approach and for enterprise evaluation Interface for the transfer of the values into the consolidation Web and GUI based BI-Reporting for all above-mentioned areas (SAP Business Intelligence)

Calculation of economic characteristic values and value-driver for enterprise controlling Risk management: Calculation and Monte-Carlo-Simulation of economic characteristic values Portfolio-Management-Approach Reporting in Balanced Scorecard BI-Reporting according to IAS 40 (opening balance sheet, appendix values, DCF-first-evaluation), IAS 11 (POC for building contractor business) and IAS 12

In the following a further detailed description:

The positions of the balance and of the profit and loss account from the source system into the BPS (Business Planning System) are selected. The positions should be displayed hierarchically as in the source system in the BPS, too. The hierarchy and the positions on their own depend on the submission of accounts. Different approaches of the submission of accounts mean for example different evaluation areas, accounts and depreciations in the placement accounting. The submission of accounts according to Commercial Code (HGB) and International Accounting Standards IAS (now: International Accounting Reporting Standards IFRS) is relevant to the Gewofag. For these two submissions of accounts these two versions of the balance- and profit and loss account hierarchies GEW3 (German language: "Bilanzstruktur_GEWOFAG(neu)") respectively GIAS (German language: "Bilanzstruktur_GEWOFAG IAS") exist in the FI (i.e. the Financial Accounted Module in SAP). Reference thereto is also in the BPS.

In analogy to the grouping of accounts into positions in the balance and profit and loss accounts hierarchies of the FI, planning positions for the selection into the BPS are also built which (planning positions) group logical continuous accounts. For example accounts of the balance position 3.1.2 (incomes from the selling of properties) are grouped to the planning position ERA_001 (income from the selling). Planning positions are grouped to planning position types for being able to load them selectively in the BPS by pushing a button. For example the positions ABS_001 (standard depreciation), ABS_002 (special depreciation) and ABS_003 are grouped to the planning position type ABS (depreciations). The summary from accounts to planning positions and from planning positions to planning position types is orientated just loosely on the balance and profit and loss accounts hierarchy. More decisive are the characterization according to the class of the allocation to account objects, according to the algorithm for the selection of the actual values and for calculating of the planned values and the as possible uncomplicated possibility to plan in the BPS. In this way there is differentiated the positions of the hierarchy GEW3 1.1.21 (properties with residential buildings)-1.1.24 (buildings on strange properties) only between BIL_112A (properties) and BIL_112B (buildings) in the BPS for simplifying the investment planning.

By means of FI- and CO-relevant SAP-Transactions which register the change of stock/stand respectively inputs and outputs said values come to a large extent into the profit-center-calculation, too. Different profit-centers were allocated to the cost centers, as also to the allocation to an account objects of the RE (Real Estate), for example the economic entities, so that it is possible to differentiate stronger than in the FI the balance and the profit and loss accounts in important partial areas, for example in the fixed assets, in the profit-center-calculation. Therefore where possible, the values of the profit-center-calculation are accessed. Allocation are grouped to one or more account objects of the profit-center-calculation to different classes for planning separately. For example there is planned Investments and maintenance efforts only referring to economic entities, Calculating depreciations only referring to cost-centers, Outputs from participations only referring to business division-profit-centers.

Accordingly there is differentiated the three partial plannings: cost-centers-, business unit- and (business-) profit-center-planning. Therefore three classes are formed from the said amount of the allocation to an account object of the profit-center-calculation: profit-center representing Economic entities, A cost-center or A business division-profit-center.

Different profit-centers can be allocated to one and the same economic entity. Therefore profit-centers are grouped for planning in BPS to profit-center-groups, so that every economic entity exactly matches to a profit-center-group. For keeping the planning unitary only on profit-center-groups in the BPS is planed, not on profit-centers. So, there is also built for profit-centers which represent cost-centers and for business-profit-centers profit-center-groups, although the allocation of profit-centers to profit-center-groups is one-to-one/unambiguous for them. Profit-centers which can be allocated to any of the three classes are allocated to the profit-center-group 0002 (Gewofag).

The planning maps are the base for the planning in the BPS. Planning maps group the planning layouts and the planning functions. The actual and the planned values are loaded which calculate our extractors in the source system by the planning functions into the planning layouts of the planning map. A planning layout represents the hierarchy of the profit-center-groups of a partial planning for selected planning positions of said partial planning. Additionally, there can be provided in a dumped/tilted presentation the hierarchy of the planning position types and planning positions of a partial planning for a selected profit-center-group. After the performance of the partial plannings, the actual and the planned values are aggregated upwards into the aggregate planning. Technically in this way it is summed up to the profit-center-group 001 Gewofag (aggregate/entire). The hierarchy of the planning positions of the aggregate/entire planning represents/maps the balance- and profit and loss account-hierarchy GEW3 respectively GIAS of the FI. The planning maps of the aggregate planning and the partial plannings refer to exactly one submission of accounts.

In the following, there are provided components of the above described method:

1. Modules of operative business management 1.1. Automated earning planning and balance sheet planning Planning characteristics:

Time frame: five years

Plain: Planpositions analog balance sheet and earning sheet

Objects: Cost Center, real estate object, Profit-Center

Cost Center planning:

Overhead costs and depreciation expenses

Real estate object planning:

Revenues

Operating costs

Rental management costs
Plant maintenance costs, modernization costs and site cleanup costs
Overhead costs
Revenue operating costs
Asset balance and receipt
Profit-Center:
  other internal activity
  Costs for sales lands
  balance sheet change
  Revenue
  Money management
1.2. Riskquantify Per Planposition
  Determination:
    confidence interval as the expected value for the actual in the days to come
    forecast as the expected value for the actual in the days to come
1.3. Operative real estate reporting
  Reports:
    Cash Flow
    Real estate information's
    Residential rental key figure
    Real estate value ranking
2. Modules of strategic enterprise management
1.1. Hierarchically enterprise earning planning and balance sheet planning
  Planning characteristics:
    Time frame: five years:
      Plain: plan positions analog balance sheet and earning sheet
      Objects: profit center; company
    Summarization the operative profit center plan values to enterprise plan values
    Summarization the operative plan values to value driver:
      Revenues
      Operating costs
      maintenance costs, modernization costs and site cleanup costs
      Rental management costs
      Overhead costs
      Revenue operating costs
      Asset balance and receipt
2.1. Riskquantify per plan position
  Annual determination:
    confidence interval as the expected value for the actual in the days to come
    forecast as the expected value for the actual in the days to come
2.2. Riskquantify per Key Performance Indicator
  Image the real estate risk catalog
  Mapping risks to Key Performance Indicators
  Monthly riskquantify:
    Forecast as the expected value
    Value at Risk
2.3. Calculation value based enterprise and real estate key figure
2.4. Calculation the Net Present Value including risk for real estate objects
2.5. Calculation the Total Net Present Value for real estate portfolios and calculation the risk
  Calculation the Value at Risk for a real estate portfolio with the Variance Covariance method:
    Product approach: Riskfactors are the Net Present Values of the real estate objects
    Model parameters are the relative change Net Present Value of the real estate objects
    Hypothesis of the allocation: The Vektor Net Present Value is standard distributed
    Transformation the standard distribution of Net Present Values to the distribution value change
2.6. Strategic reporting real estate Key Performance Indicators Accordingly, the terms plan data, plan value, expected value etc. can be used as synonyms.

Figure 30:
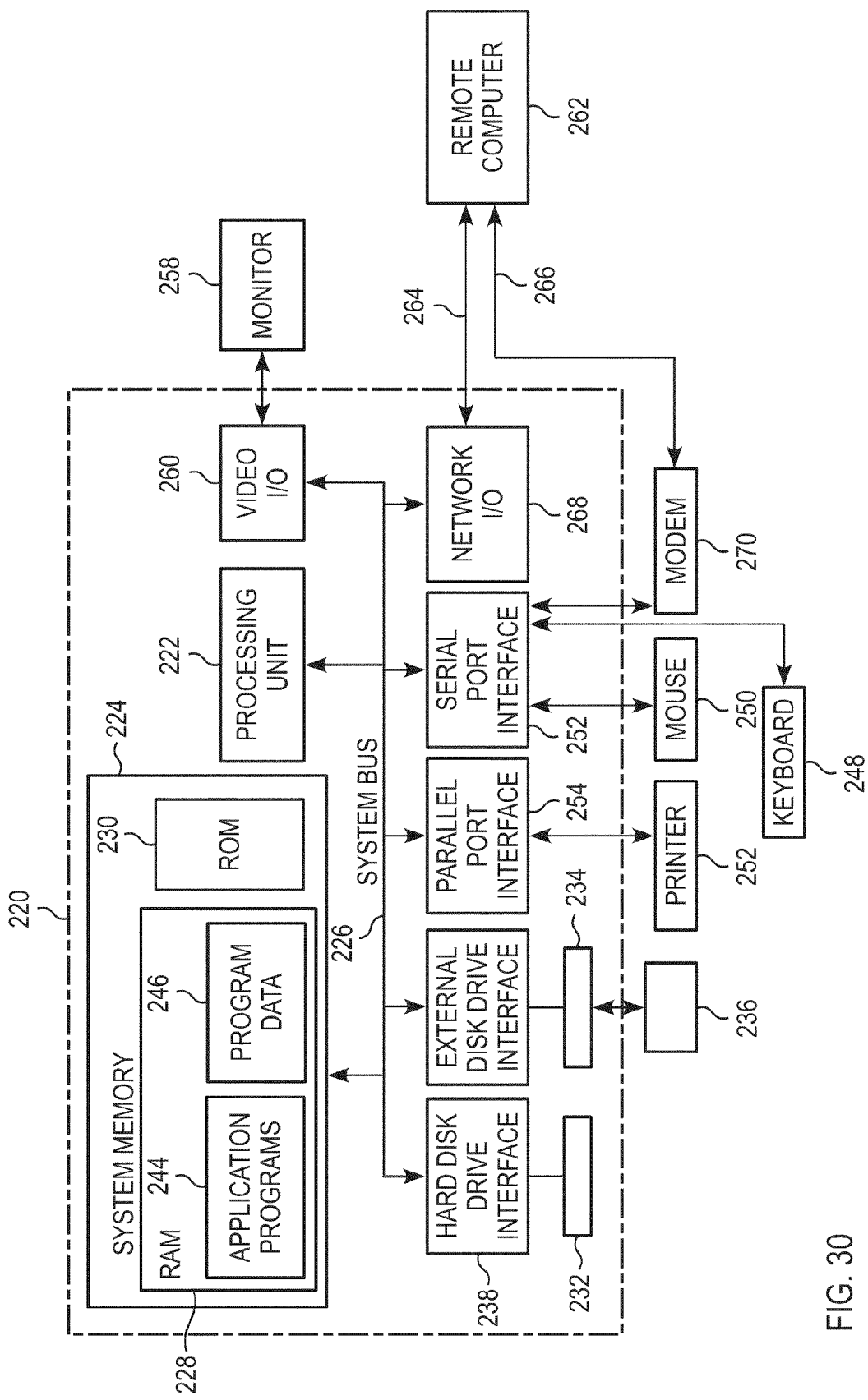
- FIG. 30: a schematic overview of a computer environment.

With reference to FIG. 30, an exemplary system for implementing the invention includes a general purpose computing device in the form of a conventional computing environment 220 (e.g. personal computer), including a processing unit 222, a system memory 224, and a system bus 226, that couples various system components including the system memory 224 to the processing unit 222. The processing unit 222 may perform arithmetic, logic and/or control operations by accessing system memory 224. The system memory 224 may store information and/or instructions for use in combination with processing unit 222. The system memory 224 may include volatile and non-volatile memory, such as random access memory (RAM) 228 and read only memory (ROM) 230. A basic input/output system (BIOS) containing the basic routines that helps to transfer information between elements within the personal computer 220, such as during start-up, may be stored in ROM 230. The system bus 226 may be any of several types of bus structures including a memory bus or memory controller, a peripheral bus, and a local bus using any of a variety of bus architectures.

The personal computer 220 may further include a hard disk drive 232 for reading from and writing to a hard disk (not shown), and an external disk drive 234 for reading from or writing to a removable disk 236. The removable disk may be a magnetic disk for a magnetic disk driver or an optical disk such as a CD ROM for an optical disk drive. The hard disk drive 234 and external disk drive 234 are connected to the system bus 226 by a hard disk drive interface 238 and an external disk drive interface 240, respectively. The drives and their associated computer-readable media provide nonvolatile storage of computer readable instructions, data structures, program modules and other data for the personal computer 220. The data structures may include relevant data of the implementation of the computerized method as described in more details above. The relevant data may be organized in a database, for example a relational or object database.

Although the exemplary environment described herein employs a hard disk (not shown) and an external disk 242, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 242, ROM 230 or RAM 228, including an operating system (not shown), one or more application programs 244, other program modules (not shown), and program data 246. The application programs may include at least a part of the functionality as detailed in FIGS. 1 to 29.

A user may enter commands and information, as discussed below, into the personal computer 220 through input devices such as keyboard 248 and mouse 250. Other input devices (not shown) may include a microphone (or other sensors), joystick, game pad, scanner, or the like. These and other input devices may be connected to the processing unit 222 through a serial port interface 252 that is coupled to the system bus 226, or may be collected by other interfaces, such as a parallel port interface 254, game port or a universal serial bus (USB).

Further, information may be printed using printer 256. The printer 256, and other parallel input/output devices may be connected to the processing unit 222 through parallel port interface 254. A monitor 258 or other type of display device is also connected to the system bus 226 via an interface, such as a video input/output 260. In addition to the monitor, computing environment 220 may include other peripheral output devices (not shown), such as speakers or other audible output.

The computing environment 220 may communicate with other electronic devices such as a computer, telephone (wired or wireless), personal digital assistant, television, or the like. To communicate, the computer environment 220 may operate in a networked environment using connections to one or more electronic devices. FIG. 30 depicts the computer environment networked with remote computer 262. The remote computer 262 may be another computing environment such as a server, a router, a network PC, a peer device or other common network node, and may include many or all of the elements described above relative to the computing environment 220. The logical connections depicted in FIG. 30 include a local area network (LAN) 264 and a wide area network (WAN) 266. Such networking environments are commonplace in offices, enterprise-wide computer networks, intranets and the Internet.

When used in a LAN networking environment, the computing environment 220 may be connected to the LAN 264 through a network I/O 268. When used in a WAN networking environment, the computing environment 220 may include a modem 270 or other means for establishing communications over the WAN 266. The modem 270, which may be internal or external to computing environment 220, is connected to the system bus 226 via the serial port interface 252. In a networked environment, program modules depicted relative to the computing environment 220, or portions thereof, may be stored in a remote memory storage device resident on or accessible to remote computer 262. Furthermore other data relevant to the application of the insurance claim management evaluation method (described in more detail further below) may be resident on or accessible via the remote computer 262. The data may be stored for example in an object or a relation database. It will be appreciated that the network connections shown are exemplary and other means of establishing a communications link between the electronic devices may be used.

The above-described computing environment is only one example of the type of computing environment that may be used to implement the computerized method.

LIST OF REFERENCE NUMERALS 10 activation device
12 data
14 past data
16 future plan data
18 current data
20 future plan data
22 monthly desired value; lower 95% boundary
24 monthly desired value; expectation variance
26 monthly estimated value
28 monthly desired value; expectation variance
30 monthly desired value; upper 95% boundary
32 period (months)
34 table
36 period (years)
38 yearly desired value; lower 95% boundary
40 yearly desired value; expectation variance
42 yearly estimated value
44 yearly desired value; expectation variance
46 yearly desired value; upper 95% boundary
48 past data
50 past data
52 future plan data
54 future plan data
56 future plan data
58 future plan data
60 future plan data
62 future plan data
64 description
66 discounting interest rates
68 cash flow
70 discounted cash flow without maintenance
72 discounted cash flow
74 discounted cash flow
76 table
78 subtable
80 subtable
82 subtable
84 graph
86 graph
88 graph
90 button
92 button
94 button
96 planning year
98 current interval
100 selection criteria
102 button
104 field
106 DCF value—constant approach
108 DCF value—linear approach
110 DCF value—non-linear approach
112 screenshot
114 booking periods
116 estimate values
118 estimate variance
120 estimate variance
122 95% confidence interval
124 95% confidence interval
126 gain values
128 current values
130 GUI
220 conventional computing environment
222 processing unit
224 system memory
226 system bus
228 random access memory (RAM)
230 read only memory (ROM)
232 hard disk drive
234 external disk drive
236 removable disk
238 hard disk drive interface
240 external disk drive interface
242 external disk
244 one or more application programs
246 program data
248 keyboard
250 mouse
252 serial port interface
254 parallel port interface
256 printer
258 monitor
260 video input/output
262 remote computer
264 local area network (LAN)

266 wide area network (WAN)
268 network I/O
270 a modem

The invention claimed is:

1. A computerized method for processing and displaying data of a business unit comprising the steps of:
   extracting, by a computer processing device, a set of past data of said business unit from a past database, wherein the extraction of said set of past data of said business unit includes:
      examining files stored within the past database, and
      extracting contract term data from said files stored within the past database;
   determining, by the computer processing device, a set of future plan data of said business unit, wherein said determining of said set of future plan data comprises:
      automatically determining by using the extracted contract term data said set of future plan data by the computer processing device;
   estimating the expectation of a discounted cash flow for each element of a set of models which define a specific growth trajectory according to said set of past data and said set of future plan data, wherein for each model:
      estimating a standard deviation from said past data;
      setting a risk premium derived from said estimated standard deviation and a predetermined risk factor;
      calculating a risk adjusted value by deducting the set risk premium from said expectation; and
   displaying the risk adjusted value and an estimated discounted cash flow value probability distribution on a display device.

2. The computerized method according to claim 1, wherein the step of automatically determining said set of future plan data comprises:
   automatically evaluating contract term data;
   automatically determining said set of future plan data from said contract term data.

3. The computerized method according claim 1, wherein said step of extracting said set of past data and said step of determining said set of future plan data comprise the step:
   displaying an activating device for simultaneously activating said extraction of at least one subset of said set of past data and determination of at least one subset of said set of future plan data in response to an input to a graphical user interface.

4. The computerized method according to claim 1, wherein said step of extracting said set of past data comprises the step:
   displaying an activating device for simultaneously activating said extraction of a plurality of subsets of said set of past data and a plurality of subsets of said set of future plan data in response to an input to a graphical user interface.

5. The computerized method according to claim 1, wherein after extracting said at least one set of past data, said data are displayed to a user for manual inspection.

6. The computerized method according to claim 1, wherein a choice of a present date is received, and wherein, after the choice of the present date is received, the set of past data and the set of future plan data are determined automatically.

7. The computerized method according to claim 6, wherein a choice of a present interval is received and wherein said set of past data is provided for a past interval and wherein said set of future plan data is provided for a future interval automatically.

8. The computerized method according to claim 7, wherein the set of past data and the set of future plan data is automatically determined using at least one of the present date and the present interval.

9. The computerized method according to claim 1, wherein for the future plan data an individual estimated discounted cash flow value is determined automatically for every time unit of said future interval.

10. The computerized method according to claim 1, wherein said set of models includes a constant business-calculation model, a linear business-calculation model, and a non-linear calculation model.

11. The computerized method according to claim 1, wherein the set risk premium is modeled based on only one parameter.

12. The computerized method according to claim 1, wherein a confidence level is selected to set the risk premium.

13. The computerized method according to claim 1, wherein the automatically determining at least one preconfigured subset of said set of future plan data by the computer processing device is determined by using the past data instead of the extracted contract term data.

14. A non-transitory computer readable storage medium including instructions that, when executed by a processor, perform the steps of:
   extracting, by a computer processing device, a set of past data of said business unit from a past database, wherein the extraction of said set of past data of said business unit includes:
      examining files stored within the past database, and
      extracting contract term data from said files stored within the past database;
   determining, by the computer processing device, a set of future plan data of said business unit, wherein said determining of said set of future plan data comprises:
      automatically determining by using the extracted contract term data said set of future plan data by the computer processing device;
   estimating the expectation of a discounted cash flow for each element of a set of models which define a specific growth trajectory according to said set of past data and said set of future plan data, wherein for each model:
      estimating a standard deviation from said past data,
      setting a risk premium derived from said estimated standard deviation and a predetermined risk factor;
      calculating a risk adjusted value by deducting the set risk premium from said expectation; and
   displaying the risk adjusted value and an estimated discounted cash flow value probability distribution on a display device.

15. A system for processing and displaying data of a business unit comprising:
   a display device;
   an enterprise resource planning system for maintaining data related to operation of a business entity;
   a business data warehousing system for collecting, planning and reporting data in communication with the enterprise resource planning system, the business data warehousing system comprising a processor configured to:
   extract a set of past data of said business unit from a past database maintained by the enterprise resource planning system by examining files stored within the past database,
   extract contract data from said files stored within the past database;

extract a set of future plan data of said business unit from a future plan database by automatically determining and extracting at least one preconfigured subset of said set of future plan data from a future plan database maintained by the enterprise resource planning system;

extract all future plan data remaining after extraction of the at least one preconfigured subset of said future plan data from said future plan database;

estimate the expectation of a discounted cash flow for each element of a set of models which define a specific growth trajectory according to said set of past data and said set of future plan data including the preconfigured subset of said future plan data, wherein for each model:
  estimate a standard deviation from said past data,
  set a risk premium derived from said estimated standard deviation and a predetermined risk factor;
  calculate a risk adjusted value by deducting the set risk premium from said expectation; and display the risk adjusted value and an estimated discounted cash flow value probability distribution on a display device.

16. The system of claim 15, wherein the set risk premium is modeled based on only one parameter.

17. The system of claim 15, wherein a confidence level is selected to set the risk premium.

18. The system of claim 15, wherein the automatically determining at least one preconfigured subset of said set of future plan data by the business data warehousing system is determined by using the past data instead of the extracted contract term data.

19. A method for valuing a business unit and providing a probability distribution and a risk adjustment using a plurality of parameterized growth models comprising the steps:
  calculating, by a processing unit, for a past interval a time series of actual data from a transaction data database maintained in a system memory;
  calculating, by the processing unit, for a future interval a time series of uncertain plan data, wherein said uncertain plan data is plan data subject to uncertainty;
  calculating, by the processing unit, for said future interval a time series of certain plan data, wherein said certain plan data is plan data having certainty;
  calculating the parameters of each of the said growth models from said actual data and said uncertain plan data using statistical techniques thus specifying a growth trajectory;
  deriving for each of said growth models beyond said future interval an infinite time series of plan data according to said growth trajectory;
  discounting said uncertain, certain and model dependent derived plan data using period corresponding market traded interest rates;
  summing up for each of said growth models said discounted plan values thus estimating an expectation of said value of said business unit;
  estimating a standard deviation for each of said models using said actual data;
  setting a risk premium for each of said models from said estimated standard deviation and a predetermined risk factor;
  calculating a risk adjusted value for each of said models by deducting said risk premium from said estimated expectation value; and
  displaying for each of said models said risk adjusted value and a probability distribution defined by said estimated expectation value and said estimated standard deviation on a display device.

20. The method according to claim 19, wherein said uncertain plan data represent operating cash flows of said business unit, and said certain plan data represent investment expenses of said business unit.

21. The method according to claim 19, further comprising:
  establishing a benchmarking index for each element of a set of business units and for each of said growth models by dividing said risk adjusted value by a first value of said growth trajectory in said future interval.

22. The method according to claim 19, wherein for calculating the parameters of each of the said growth models said actual data and said uncertain plan data are adjusted for inflation, and the model dependent derived plan data are discounted using a period corresponding market trading interest rates, wherein the corresponding market trading interest rates are adjusted for inflation.

23. The method according to claim 22, wherein the market trading interest rates of the period represent risk free interest rates.

* * * * *